United States Patent
Matsuyama et al.

(10) Patent No.: US 6,990,583 B2
(45) Date of Patent: Jan. 24, 2006

(54) PUBLIC-KEY-ENCRYPTION DATA-COMMUNICATION SYSTEM AND DATA-COMMUNICATION-SYSTEM FORMING METHOD

(75) Inventors: Shinako Matsuyama, Tokyo (JP); Yoshihito Ishibashi, Tokyo (JP); Ichiro Futamura, Kanagawa (JP); Masashi Kon, Kanagawa (JP); Hideaki Watanabe, Chiba (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 09/793,063

(22) Filed: Feb. 26, 2001

(65) Prior Publication Data

US 2001/0034834 A1 Oct. 25, 2001

(30) Foreign Application Priority Data

Feb. 29, 2000 (JP) .................................. P2000-054091
Apr. 24, 2000 (JP) .................................. P2000-123027

(51) Int. Cl.
  *G06F 17/00* (2006.01)

(52) U.S. Cl. ..................... 713/175; 713/168; 713/150
(58) Field of Classification Search ......... 713/200–202, 713/150–182; 709/201–203
See application file for complete search history.

(56) References Cited

PUBLICATIONS

The problem with multiple roots in Web browsers–certificate masquerading Hayes, J.M.; Enabling Technologies: Infrastructure for Collaborative Enterprises, 1998. (WET ICE '98) Proceedings., Seventh IEEE.*
Secure in–band update of trusted certificates Hayes, J.M.; Enabling Technologies: Infrastructure for Collaborative Enterprises, 1999. (WET ICE '99) Proceedings. IEEE 8th International.*
Restricting access with certificate attributes in multiple root environments—a recipe for certificate masquerading Hayes, J.M.; Computer Security Applications Conference, 2001. ACSAC 2001. Proceedings 17th Annual, Dec. 10–14, 2001.*
Enterprise strength security on a JXTA P2P network Yeager, B.; Peer–to–Peer Computing, 2003. (P2P 2003). Proceedings. Third International Conference on Sep. 1–3, 2003.*
John Rogers, "*Progress Towards a Public Key Infrastructure in Australia*", The Institute of Electrical and Electronic Engineers: $31^{st}$ Annual 1997 International Carnahan Conference on Security Technology, Oct. 15–17, 1997, pp. 120–122, XP010248863, Canberra, ACT, Australia.

* cited by examiner

*Primary Examiner*—David Jung Au
(74) *Attorney, Agent, or Firm*—Sonnenschein, Nath & Rosenthal LLP

(57) ABSTRACT

A public-key-encryption data-communication system includes a public-key-certificate issuer authority. The public-key-certificate issuer authority performs the issuance of a public key certificate and management operations, certification of a subject to be certificated, which is a certificate issuing request, and management such as registration processing are executed by a root registration authority or each registration authority. The public-key-certificate issuer authority performs processing for validating, invalidating, and deleting the certificate in accordance with a request from the root registration authority. The root registration authority accepts a request for issuing a public key certificate corresponding to the subject to be certificated which is under the control of a certificated registration authority, and transfers it to the public-key-certificate issuer authority in a form in which a signature is added to it. Processes by the public-key-certificate issuer authority, the root registration authority, the registration authority are separated, whereby the need for new implementation of user recognition, certificate issuance, registration, and management is eliminated.

27 Claims, 29 Drawing Sheets

FIG. 5

| ITEM | CONTENT |
|---|---|
| RA ID | ID OF RA TO WHICH SERVICE IS PROVIDED |
| ID | ID FOR IDENTIFYING SUBJECT |
| PUBLIC KEY | PUBLIC KEY OF SUBJECT |
| CERTIFICATE | CERTIFICATE BODY |
| VALIDITY FLAG | FLAG INDICATING VALIDITY OR INVALIDITY |

FIG. 6

| ITEM | DESCRIPTION | SETTINGS IN THE IA |
|---|---|---|
| VERSION 1 | | |
| version | VERSION OF CERTIFICATE FORMAT | V3 |
| serial Number | SERIAL NO. OF CERTIFICATE ASSIGNED BY IA | SEQUENTIAL SERIAL NUMBER |
| signature. algorithm Identifier<br>    algorithm<br>    parameters | CERTIFICATE SIGNATURE ALGORITHM AND ITS PARAMETERS | ELLIPTIC CURVE ENCRYPTION/RSA PARAMETERS FOR ELLIPTIC CURVE/KEY LENGTH FOR RSA |
| issuer | IA NAME (Distinguished Name FORM) | NAME OF THE IA |
| validity<br>    notBefore<br>    notAfter | CERTIFICATE VALIDITY PERIOD<br>    START TIME<br>    END TIME | |
| subject | USER IDENTIFYING NAME | USER APPARATUS ID OF ID OF SERVICE BODY |
| subject Public Key Info.<br>    algorithm<br>    subject Public key | USER PUBLIC KEY INFORMATION<br>    ALGORITHM OF KEY, KEY | ELLIPTIC CURVE/RSA USER PUBLIC KEY |
| VERSION 3 | | |
| authority Key Identifier<br>    key Identifier<br>    authority Cert Issuer<br>    authority Cert Serial Number | KEY IDENTIFICATION KEY IDENTIFIER NO. (OCTAL) FOR VERIFYING<br>IA NAME (General Name FORM)<br>AUTHORIZATION NO. | |
| subject key Identifier | WHEN A PLURALITY OF KEYS ARE CERTIFIED | NOT USED |
| key usage<br>    (0) digital Signature<br>    (1) non Repudiation<br>    (2) key Encipherment<br>    (3) data Encipherment<br>    (4) key Agreement<br>    (5) key CertSign<br>    (6) cRL Sign | DESIGNATES PURPOSE OF USING KEY<br>  (0) FOR DIGITAL SIGNATURE<br>  (1) FOR NON-REPUDIATION<br>  (2) FOR KEY ENCIPHERMENT<br>  (3) FOR DATA ENCIPHERMENT<br>  (4) FOR SYMMETRIC KEY TRANSFER<br>  (5) FOR VERIFYING SIGNATURE OF CERTIFICATE<br>  (6) FOR VERIFYING SIGNATURE OF REVOCATION LIST | 0, 1, 4, AND 6 USED |
| private Key Usage Period<br>    notBefore<br>    notAfter | VALIDITY PERIOD OF PRIVATE KEY STORED IN USER | CERTIFICATE VALIDITY PERIOD = PUBLIC KEY VALIDITY PERIOD<br>= PUBLIC KEY VALIDITY PERIOD<br>= PRIVATE KEY VALIDITY PERIOD (default) |

FIG. 7

| ITEM | DESCRIPTION | SETTINGS IN THE IA |
|---|---|---|
| policy Mappings<br>   issuer Domain Policy<br>   subject Domain Policy | REQUIRED ONLY WHEN CA IS CERTIFIED. DEFINES MAPPINGS OF ISSUER DOMAIN POLICY AND SUBJECT DOMAIN POLICY | default = NONE |
| supported Algorithms<br>   algorithm Identifier<br>   intended Usage<br>   intended Certificate Policies | DEFINES ATTRIBUTE OF DIRECTORY (X.500). USED TO SEND ATTRIBUTE OF DIRECTORY INFORMATION BEFORE HAND WHEN ONE WITH WHICH COMMUNICATION IS ESTABLISHED | default = NONE |
| subject Alt Name | ALTERNATE NAME OF USER (GN FORM) | NOT USED |
| issuer ALT Name | ITEM INSERTED (default = NONE) | default = NONE |
| subject Directory Attributes | ARBITRARY ATTRIBUTES OF USER | NOT USED |
| basic Constraints<br>   cA<br>   path Len Constraint | DETERMINES WHETHER PUBLIC KEY IS FOR CERTIFICATE SIGNATURE OR FOR USER'S | default = USER USE |
| name Constraints<br>   permitted Subtrees<br>     base<br>     minimum<br>     maximum<br>   excluded Subtrees | USED ONLY WHEN SUBJECT TO BE CERTIFIED IS CERTIFICATE AUTHORITY (CA CERTIFICATION) | default = NONE |
| policy Constraints<br>   require ExplicitPolicy<br>   inhibitPolicyMapping | DESCRIBES CONSTRAINTS REQUIRING EXPLICIT CERTIFICATE POLICY ID AND INHIBIT POLICY MAPPING | |
| CRL Distribution Points | DESCRIBES REFERENCE POINTS OF REVOCATION LIST FOR CHECKING WHETHER CERTIFICATE IS REVOKED WHEN USER USES CERTIFICATE | POINTER TO POSITION AT WHICH CERTIFICATE IS REGISTERED. REVOCATION LIST IS MANAGED BY ISSUER |
| SIGNATURE | ISSUER'S SIGNATURE | |

FIG. 8

| ITEM | | CONTENT |
|---|---|---|
| ID | | SUBJECT IDENTIFYING ID |
| CERTIFICATE DATA | | INFORMATION REQUIRED FOR CERTIFYING SUBJECT |
| CERTIFICATE RESULT | | LAST CERTIFICATE RESULT (VERIFICATION, CREDIT RESULT) |
| REVOCATION | | POINTER TO THE FOLLOWING INFORMATION |

FIG. 9

| ITEM | DESCRIPTION | |
|---|---|---|
| V1 | | |
| Signature. algorithm Identifier | SIGNATURE ALGORITHM | ELLIPTIC CURVE ENCRYPTION/RSA |
| Issuer | REVOCATION LIST ISSUER NAME | NAME OF THE IA |
| This Update | ISSUANCE DATE AND TIME OF REVOCATION LIST | |
| Next Update | NEXT ISSUANCE DATE | |
| V2 | | |
| Version | VERSION | |
| Authority key indentifier<br><br>Key Identifier<br>Authority Cert Issuer<br>Authority Cert Serial Number | CERTIFICATE IDENTIFIER TO BE USED FOR SIGNATURE VERIFICATION<br>KEY IDENTIFICATION NO.(OCTAL)<br>IA NAME (General Name FORM)<br>CERTIFICATE NUMBER | |
| CRL Number | SERIAL NO. OF REVOCATION LIST | |
| Issuing distribution point<br><br><br>Distribution poin<br>Only contains user certs<br><br><br>Only contains CA certs<br><br>Only some reasons<br><br>indirect CRL | PROPERTIES OF REVOCATION LIST DISTRIBUTION AUTHORITY<br>DISTRIBUTION AUTHORITY NAME (GN FORM)<br>"TRUE" FOR DEDICATEDUSE OF SUBSCRIBER REVOCATION<br>"TRUE" FOR DEDICATED USE OF CA CERTIFICATE REVOCATION<br>INFORMATION SUCH AS REVOCATION REASONS CAUSED BY SOME REASONS IS SENT NOT TO REVOCATION LIST ISSUER AUTHORITY BUT TO CERTIFICATE ISSUER AUTHORITY | |
| DeltaCRLIndicator | INDICATES WHETHER REVOCATION LIST IS DIFFERENTIAL | |

FIG. 10

| ITEM | DESCRIPTION | |
|---|---|---|
| V1 | | |
| Certificate Serial Number | CERTIFICATION NUMBER | |
| Revocation Date | DATE AND TIME OF ACCEPTING APPLICATION FOR REVOCATION | |
| V2 | | |
| Reason code | REVOCATION REASON<br>0: REASON UNKNOWN<br>1: SUBSCRIBER COMPROMISED<br>2: CA KEY COMPROMISED<br>3: CERTIFICATE INFORMATION CHANGED<br>4: CERTIFICATE REPLACED<br>5: USE DISCONTINUED<br>6: USE SUSPENDED<br>7: SUSPENSION TERMINATED | |
| Hold instruction code | WAY TO COPE WITH SUSPENSION OF USE | |
| Invalidity date | DATE AND TIME AT WHICH PRIVATE KEY WOULD HAVE BEEN DAMAGED | |
| Certificate issuer | INDIRECTLY REACH CA SINCE REVOCATION INFORMATION IS NOT MANAGED BY REVOCATION LIST ISSUER IN THE CASE OF CERTIFICATE ISSUER NAME (GN FORM) INDIRECT REVOCATION LIST | |
| SIGNATURE | ISSUER'S SIGNATURE | |

FIG. 15

| NO. | TERM | SYMBOL | DESCRIPTION/NOTES |
|---|---|---|---|
| 1 | PUBLIC KEY | $K_{Pa}$ | A'S PUBLIC KEY<br>User → $K_{Pu}$ ┊ UD → $K_{Pud}$<br>SP → $K_{Psp}$ ┊ SB → $K_{Psb}$ |
| 2 | PRIVATE KEY | $K_{Sa}$ | A'S PRIVATE KEY<br>User → $K_{Su}$ ┊ UD → $K_{Sud}$<br>SP → $K_{Ssp}$ ┊ SP → $K_{Ssb}$ |
| 3 | SESSION KEY | $K_s$ | SYMMETRIC KEY GENERATED IN CROSS CERTIFICATION |
| 4 | CERTIFICATE | A《B》 | CERTIFICATE OF B ISSUED BY A<br>UD CERTIFICATE BY IA → IA《UD》 |
| 5 | ENCRYPTION | $E_{Ks}$(data) | USE KEY $K_s$ TO ENCRYPT PLAINTEXT Data |
| 6 | DECRYPTION | $D_{Ks}$(data) | USE KEY $K_s$ TO DECRYPT CRYPTOGRAM Data |
| 7 | SIGNATURE | {data} Sig.$K_{Sa}$ | USE A'S PRIVATE KEY $K_{Sa}$ TO SIGN Data |
| 8 | ENCRYPTION WITH SIGNATURE | $E_{Ks}$({data} Sig.$K_{Sa}$) | USE A'S PRIVATE KEY $K_{Sa}$ TO SIGN data, AND USE $K_s$ TO ENCRYPT (data ‖ SIGNATURE) |

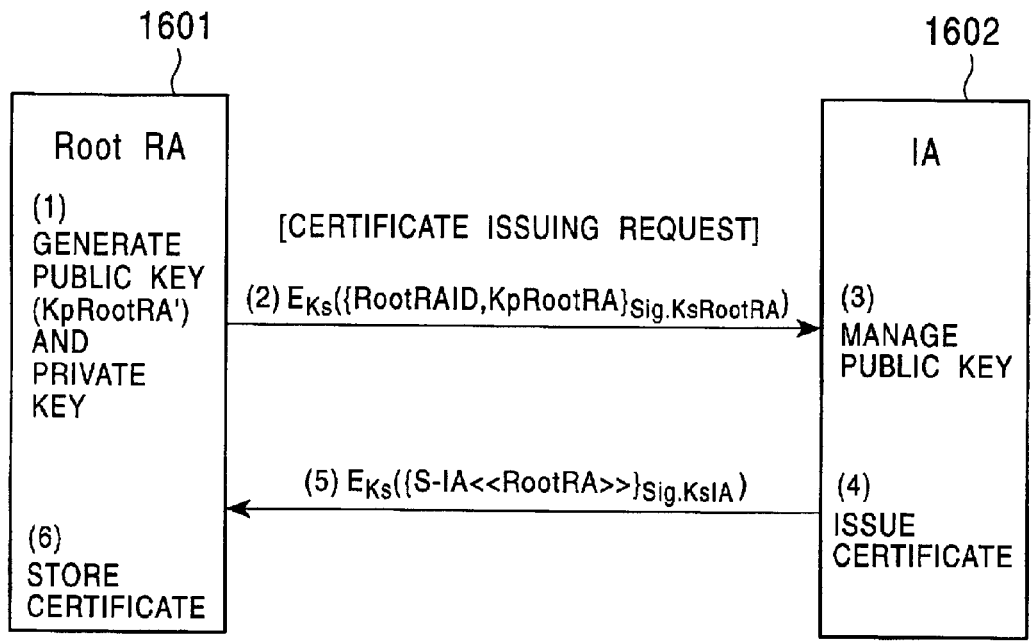
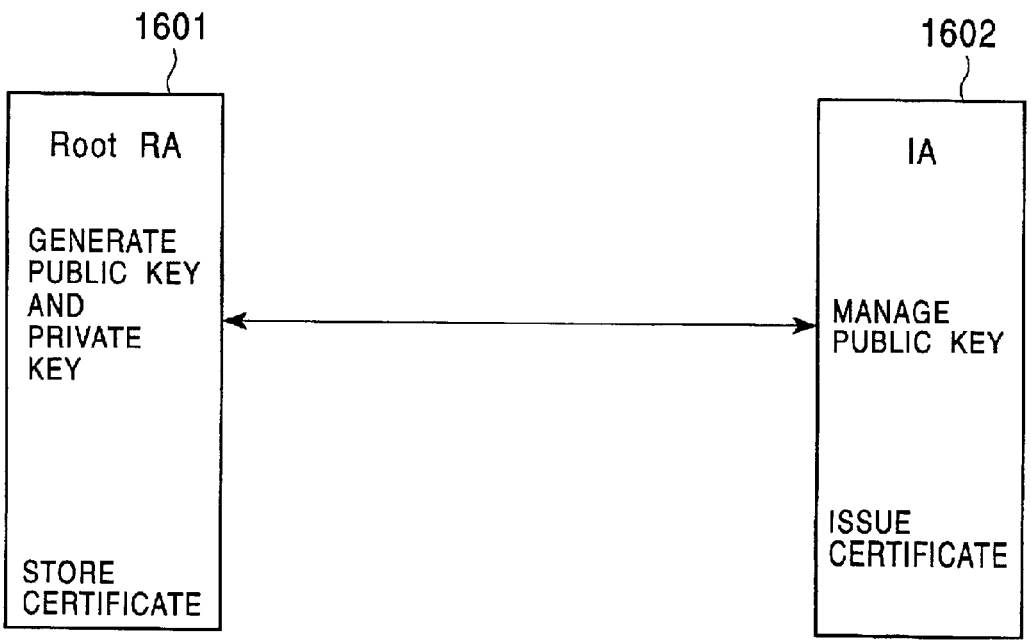

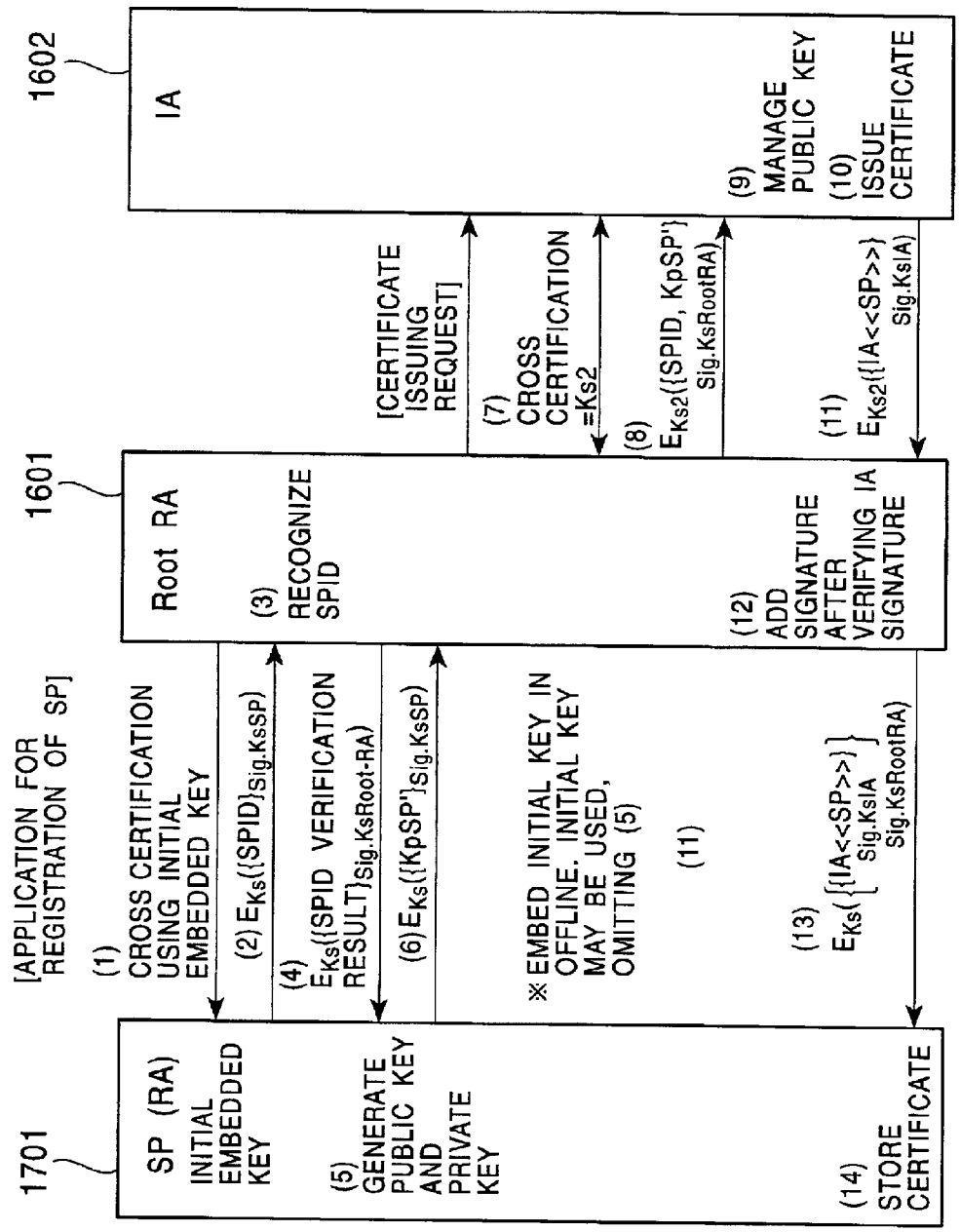

FIG. 26

| NO. | SYSTEM HOLDER | CONTENTS CREATOR | SERVICE PROVIDER | USER DEVICE |
|---|---|---|---|---|
| 1 | INTERMENT-SHOP-MARKET ORGANIZER AUTHORITY | GENERATOR AND MANUFACTURER OF MARKET-PROVIDED GOODS AND CONTENTS | MARKET-PROVIDED GOODS SHOP | PC |
| 2 | CELLULAR-PHONE-COMMUNICATION-INFRASTRUCTURE PROVIDING AUTHORITY | GENERATOR OF CONTENTS AND GOODS THAT ARE PROVIDED USING CELLULAR PHONE INFRASTRUCTURE | DISTRIBUTOR OF CONTENTS TO CELLULAR PHONE USERS | CELLULAR PHONE |
| 3 | CABLE-TV-CABLE MANAGEMENT AUTHORITY | CABLE TV PROGRAM PROVIDER | CABLE TV COMPANY | TV (RECEIVER) |
| 4 | ELECTRONIC-MONEY-CARD ISSUER AUTHORITY | GENERATOR OF GOODS AND CONTENTS THAT CAN BE PURCHASED BY ELECTRONIC MONEY | ELECTRONIC-MONEY-USABLE SHOP | IC CARD |
| 5 | . . . | . . . | . . . | . . . |
| 6 | . . . | . . . | . . . | . . . |

PUBLIC-KEY-ENCRYPTION DATA-COMMUNICATION SYSTEM AND DATA-COMMUNICATION-SYSTEM FORMING METHOD

RELATED APPLICATION DATA

The present application claims priority to Japanese Applications Nos. P2000-054091 filed Feb. 29, 2000, and P2000-123027 filed Apr. 24, 2000, which applications are incorporated herein by reference to the extent permitted by law.

BACKGROUND OF THE INVENTION

1. Field of the Invention

The present invention relates to public-key-certificate issuing systems for proving the validity of a public key for use in encrypted data transmission in electronic distribution systems, and data communication methods. In particular, the present invention relates to a public-key-certificate issuing system in which a data-transmission-service entity enables a public key and a public-key certificate to be used for general purposes without having a certificate authority function for issuing a public-key certificate, and to a data communication method.

2. Description of the Related Art

Nowadays, various types of software data (hereinafter referred to as "contents"), such as game programs, audio data, image data, and document-making programs, are distributed via networks such as the Internet. Also, the purchase and sale of goods via a network, such as online shopping, has become gradually popular.

In data communication of the above network type, in general, a data transmitting side and a data receiving side transfer necessary data to each other after verifying that each side is correct, in other words, a data transfer system in which security is taken into consideration is formed. In a technique for realizing a security system in data transfer, encryption processing on data to be transferred and sign processing on data are performed.

By decryption processing based on a predetermined procedure, encrypted data can be restored to decrypted data (plaintext) that is usable. Data encryption and decryption have been well known in which an encryption key is used in encryption processing on the information and a decryption key is used in decryption processing.

There are various types of data encryption and decryption using encryption and decryption keys. One example of the types is a so-called "public key encryption". In the public key encryption, by using different keys for a transmitter and a receiver, one key is used as a public key that can be used by unspecified users, and the other key is used as a private key that is kept secret. For example, a data encryption key is used as a public key, and a decryption key is used as a private key. Otherwise, the public key encryption is used in a form that uses a certificator generating key as a private key and a certificator decrypting key as a public key.

The public key encryption is advantageous to the management of keys since it differs from a so-called "symmetric-key encryption method" using a symmetric key for decryption in that a particular person needs to have a private key that must be kept secret. However, since the symmetric-key encryption method has a slower data processing speed than that of the public key encryption, it is often used for small-data-amount objects such as a private key delivery, and digital signing. One typical example of the public key encryption is RSA (Rivest-Shamir-Aldleman) encryption. This uses the product of very large prime numbers (e.g., 150 digits), and uses difficulty of factorization processing on the product of the two large prime numbers.

In the public key encryption, a technique is often used which is designed allowing the general public to use a public key and which uses a public-key certificate certificating the validity of a distributed public key. For example, User A generates a pair of a public key and a private key, sends the generated public key to a certificate authority, and obtains a public-key certificate from the certificate authority. User A opens the public-key certificate to the public. By obtaining the public key from the public-key certificate by performing a predetermined procedure, an unspecified user encrypts a document or the like, and sends it to User A. User A is a system that uses the private key to decrypt the encrypted document. User A is also a system that puts a signature on the document by using the private key and that verifies the signature by obtaining the public key from the public-key certificate through a predetermined procedure.

The public-key certificate is described with reference to FIG. 1. The public-key certificate is a certificate issued by a certificate authority or an issuer authority, and is a certificate made such that, by submitting from a user the user's ID, a public key, etc., to the certificate authority, the certificate authority adds information such as the ID of the certificate authority and a revocation date and also puts a certificate authority's signature.

The public-key certificate shown in FIG. 1 includes a certificate version number, a certificate serial number assigned to a certificate user by the certificate authority, algorithm and parameters used for electronic signing, a certificate authority name, a certificate revocation date, a certificate user name (user ID), a public key for the certificate user, and an electronic signature of the certificate user.

The electronic signature is data generated by generating a hash value by applying a hash function to the entirety of the certificate version number, the certificate serial number assigned to the certificate user by the certificate authority, the algorithm and parameters used for electronic signing, the certificate authority name, the certificate revocation date, the certificate user name, the entirety of the public key of the certificate user, and the electronic signature, and using a certificate-authority private key on the hash value.

The certificate authority issues the public key certificate shown in FIG. 1, updates the public-key certificate that has expired, and performs the generation, management, and distribution (these are called "revocation") of an unauthorized person list for expelling users who have taken unauthorized conducts. The certificate authority also generates a public key and a private key, as required.

When using the public-key certificate, a user uses the certificate authority public key retained by the user to verify the electronic signature on the public-key certificate, extracts the public key from the public-key certificate after succeeding in the verification of the electronic signature, and uses the public key. Accordingly, all users who use the public-key certificate must retain certificate-authority public keys that are common.

In a data transmission system based on the above-described public key encryption using a public-key certificate issued by a certificate authority, if a different public key is used, it is required to newly request a certificate authority to issue a public-key certificate corresponding to the public key, or it is required to construct a certification system having a certificate authority function. In other words, for example, when a service provider that distributes contents or offers a goods providing service starts a new service (new electronic distribution system) and starts to use a new public key, the service provider always must request a certificate authority to perform the issuance and management of a public-key certificate corresponding to the new public key or to construct a certificating system having a certificate authority system, so that problems occur in that a lot of costs and time are required. In addition, when certificates issued by different certificate authorities are used to perform communication, it is required, for verifying issuance authority signatures in the certificates, that a signature verifying key be acquired by establishing a link to a center, and this case is not suitable for offline use.

SUMMARY OF THE INVENTION

Accordingly, it is an object of the present invention to provide a public-key-encryption data-communication system and data-communication method that simplify a public-key-certificate issuing system and that enable a service provider to easily use a public-key certificate when a service provider starts a new service.

To this end, according to an aspect of the present invention, the foregoing object is achieved through provision of a public-key-encryption data-communication system including a public-key-certificate issuer authority for issuing a public key certificate corresponding to a subject to be certificated which performing data transfer using public key encryption, a root registration authority which executes mutual data transfer with the public-key-certificate issuer authority, which performs certification of the subject when the subject is under the control of the root registration authority and which requests the public-key-certificate issuer authority to issue the public key certificate corresponding to the subject, and a registration authority which executes mutual data transfer with the root registration authority, which performs certification of the subject when the subject is under the control of the registration authority and which requests the root registration authority to issue the public key certificate corresponding to the subject.

Preferably, in the public-key-encryption data-communication system, the root registration authority treats a plurality of registration authorities as subjects to be certificated, and each of the plurality of registration authorities treats, as a subject to be certificated, one of at least one service provider, at least one user terminal, and at least one user which are under the control of the registration authority.

In the public-key-encryption data-communication system, the registration authority or at least one service provider which is under the control of the registration authority may apply, to a plurality of different services, a public key certificate corresponding to a subject to be certificated which is under the control of the registration authority or of the at least one service provider which is under the control of the registration authority.

In the public-key-encryption data-communication system, the root registration authority may include, as one of a plurality of registration authorities as subjects to be certificated which are under the control of the root registration authority, a clearing center for executing settlement processing, and in processing using a public key certificate which is issued via the clearing center, settlement may be performed which relates to a service provided by a registration authority other than the clearing center which is under the control of the root registration authority or by at least one service provider which is under the control of the registration authority other than the clearing center.

In the public-key-encryption data-communication system, the public-key-certificate issuer authority may hold a list of the correspondence among public keys and corresponding public key certificates, and the identifiers of subjects to be certificated for which the public key certificates are issued, and either the root registration authority or the registration authority may hold entity data which correspond to the subjects and which include certification data on the subjects.

In the public-key-encryption data-communication system, the public key certificates may each include an electronic signature field for an electronic signature of the public-key-certificate issuer authority, and a plurality of algorithms may be used as a signature algorithm for the electronic signature generated in the electronic signature field, and the public key certificates may each include a field identifying the used algorithm.

In the public-key-encryption data-communication system, in data transfer between the public-key-certificate issuer authority and the root registration authority, cross certification processing may be performed, and when the cross certification is established, mutual data transfer may be executed. In data transfer between the root registration authority and the registration authority, cross certification processing may be performed, and when the cross certification is established, mutual data transfer may be executed, and in data transfer between the registration authority and the subject, cross certification processing may be performed, and when the cross certification is established, mutual data transfer may be executed.

In the public-key-encryption data-communication system, between two among the public-key-certificate issuer authority, the root registration authority, the registration authority, and the subject, data may be transferred in a form in which the data includes a generated electronic signature of a data transmitting side.

Preferably, in the public-key-encryption data-communication system, at least one of the root registration authority and the registration authority possesses a revocation list concerning public key certificates corresponding to subjects which are under the control of the at least one, executes the updating of the revocation list, and requests the public-key-certificate issuer authority to perform data processing corresponding to the updating.

In the public-key-encryption data-communication system, at least one of the root registration authority and the registration authority may request the issuance of a plurality of public key certificates corresponding to a plurality of services which are under the control of the one authority.

In the public-key-encryption data-communication system, the public key certificate may include a common electronic signature of the public-key-certificate issuer authority which issues the public key certificate, and one of a root registration authority, a registration authority, a service provider, and a user device which perform processing for the verification of one public key certificate issued by the public-key-certificate issuer authority may perform offline processing for the verification of different public key certificates issued by a single public-key-certificate issuer authority.

In the public-key-encryption data-communication system, the registration authority may be formed as a system holder as an authority which provides or manages a distribution infrastructure for contents which are usable by a user terminal, contents for use in providing a service, or a service, and the system holder may control and may treat a service provider and the user terminal as subjects to be certificated.

Preferably, in the public-key-encryption data-communication system, the root registration authority controls a plurality of system holders which provide or manage an infrastructure for distributing different contents or services, receives a public-key-certificate issuing request via one of the system holders from one of at least one service provider and at least one user terminal which are under the control of the one system holder, and requests the public-key-certificate issuer authority to issue a public key certificate.

In the public-key-encryption data-communication system, under the control of the system holder, the system holder may have contents creator which performs provision of contents by using a distribution infrastructure for contents or a service provided or managed by the system holder, and the system holder may treat the contents creator as a subject to be certificated.

Preferably, in the public-key-encryption data-communication system, a user device which is under the control of a plurality of different system holders controlled by a common public-key-certificate issuer authority has a public key of the common public-key-certificate issuer authority.

According to another aspect of the present invention, the foregoing object is achieved through provision of a public-key-encryption data-communication-system forming method including the steps of requesting, by a subject to be certificated, a registration authority to issue a public key certificate, transferring, from the registration authority to a root registration authority certificating the registration authority, a public-key-certificate issuing request from the subject, and transferring, from the root registration authority to a public-key-certificate issuer authority certificating the root registration authority, the public-key-certificate issuing request from the subject.

Preferably, in the public-key-encryption data-communication-system forming method, the root registration authority treats a plurality of registration authorities as subjects to be certificated, and each of the plurality of registration authorities treats, as a subject to be certificated, one of at least one service provider, at least one user terminal, and at least one user which are under the control of the registration authority.

In the public-key-encryption data-communication-system forming method, the registration authority or at least one service provider which is under the control of the registration authority may apply, to a plurality of different services, a public key certificate corresponding to a subject to be certificated which is under the control of the registration authority or of the at least one service provider which is under the control of the registration authority.

In the public-key-encryption data-communication-system forming method, the root registration authority may include, as one of a plurality of registration authorities as subjects to be certificated which are under the control of the root registration authority, a clearing center for executing settlement processing, and in processing using a public key certificate which is issued via the clearing center, settlement may be performed which relates to a service provided by a registration authority other than the clearing center which is under the control of the root registration authority or by at least one service provider which is under the control of the registration authority other than the clearing center.

In the public-key-encryption data-communication-system forming method, the public-key-certificate issuer authority may hold a list of the correspondence among public keys and corresponding public key certificates, and the identifiers of subjects to be certificated for which the public key certificates are issued, and either the root registration authority or the registration authority may hold entity data which correspond to the subjects and which include certification data on the subjects.

In the public-key-encryption data-communication-system forming method, the public key certificates may each include an electronic signature field for an electronic signature of the public-key-certificate issuer authority, and a plurality of algorithms may be used as a signature algorithm for the electronic signature generated in the electronic signature field, and the public key certificates may each include a field identifying the used algorithm.

In the public-key-encryption data-communication-system forming method, in data transfer between the public-key-certificate issuer authority and the root registration authority, cross certification processing may be performed, and when the cross certification is established, mutual data transfer may be executed. In data transfer between the root registration authority and the registration authority, cross certification processing may be performed, and when the cross certification is established, mutual data transfer may be executed, and in data transfer between the registration authority and the subject, cross certification processing may be performed, and when the cross certification is established, mutual data transfer may be executed.

In the public-key-encryption data-communication-system forming method, between two among the public-key-certificate issuer authority, the root registration authority, the registration authority, and the subject, data may be transferred in a form in which the data includes a generated electronic signature of a data transmitting side.

Preferably, in the public-key-encryption data-communication-system forming method, at least one of the root registration authority and the registration authority possesses a revocation list concerning public key certificates corresponding to subjects which are under the control of the at least one, executes the updating of the revocation list, and requests the public-key-certificate issuer authority to perform data processing corresponding to the updating.

In the public-key-encryption data-communication-system forming method, at least one of the root registration authority and the registration authority may request the issuance of a plurality of public key certificates corresponding to a plurality of services which are under the control of the one authority.

In the public-key-encryption data-communication-system forming method, the public key certificate may include a common electronic signature of the public-key-certificate issuer authority which issues the public key certificate, and one of a root registration authority, a registration authority, a service provider, and a user device which perform processing for the verification of one public key certificate issued by the public-key-certificate issuer authority may perform offline processing for the verification of different public key certificates issued by a single public-key-certificate issuer authority.

In the public-key-encryption data-communication-system forming method, the registration authority may be formed as a system holder as an authority which provides or manages a distribution infrastructure for contents which are usable by a user terminal, contents for use in providing a service, or a service, and the system holder may control and may treat a service provider and the user terminal as subjects to be certificated.

Preferably, in the public-key-encryption data-communication-system forming method, the root registration authority controls a plurality of system holders which provide or manage an infrastructure for distributing different contents or services, receives a public-key-certificate issuing request via one of the system holders from one of at least one service provider and at least one user terminal which are under the control of the one system holder, and requests the public-key-certificate issuer authority to issue a public key certificate.

In the public-key-encryption data-communication-system forming method, under the control of the system holder, the system holder may have contents creator which performs provision of contents by using a distribution infrastructure for contents or a service provided or managed by the system holder, and the system holder may treat the contents creator as a subject to be certificated.

Preferably, in the public-key-encryption data-communication-system forming method, a user device which is under the control of a plurality of different system holders controlled by a common public-key-certificate issuer authority has a public key of the common public-key-certificate issuer authority.

The present invention enables control of a root registration authority to perform certificate acquiring processing that is conventionally performed by each service provider, and enables, for example, control of a clearing center (payment RA) to perform credit control processing (user's credit inquiry) with banking facilities such as banks, which is executed for settlement caused by the distribution of contents, without controlling a provider that performs contents distribution to perform the processing. In other words, a service provider that starts a new electronic distribution business can entrust the management of issuance of public key certificates to the root registration authority and the a public-key-certificate issuer authority, and can entrust settlement processing to another registration authority which is under the control of the root registration authority, whereby the service provider enables provision of service that uses a user public key certificate by only performing user managing operations.

Also the user managing operations can be entrusted to the root registration authority. A registration authority as a service provider can be designed to receive user information, revocation information, etc., from the root registration authority, as required.

In the present invention, a public-key-certificate issuer authority performs issuance of public key certificates and management operations, and user management, such as processing of registering users who use public key certificates, is entrusted to a root registration authority, whereby the need for executing user identifying operations dependent on service contents is eliminated. Also revocation list management is performed by the root registration authority, and the public-key-certificate issuer authority performs only processing for validating, invalidating, and deleting the certificate in accordance with a request from the root registration authority.

As described above, in the present invention, processes by a public-key-certificate issuer authority, a root registration authority, and a registration authority are separately performed, whereby, for each service, the identification of a user, and the issuance, registration, and management of public key certificates are not required to be newly configured in the same way as in a conventional system, whereby a new service using a public key and a public key certificate can be started by using existing data to configuring only necessary part.

In the present invention, a public-key-certificate issuer authority executes public-key-certificate issuing processing, and a root registration authority executes the management of users who use public key certificates issued by the public-key-certificate issuer authority. Accordingly, a public key certificate issued by the public-key-certificate issuer authority can be used in common in various services provided by a plurality of service providers (registration authorities or service providers managed by the registration authority), whereby a service provider that will provide a new service does not need to configure a registration authority function.

In addition, since a public key certificate issued by a public-key-certificate issuer authority is based on a standard format, it is compatible with a public key certificate issued by an existing registration authority, whereby it is possible to allow an existing system and the system of the present invention to exist in a mixed form.

According to the present invention, processes by a public-key-certificate issuer authority, a root registration authority, and a registration authority are separately performed, and for each service, the identification of a user, and the issuance, registration, and management of public key certificates are not required to be newly configured in the same way as in a conventional system, whereby a new service using a public key and a public key certificate can be started by using existing data to configuring only necessary part, whereby a load on the registration authority as in the conventional system can be reduced.

According to the present invention, by forming a registration authority as a system holder that is an authority for providing or managing a contents or service distributing infrastructure for enabling provision of contents or services, certification and data communication using a common public key certificate can be executed between different infrastructures, and in a user device, the use of various services provided by different providers, or cross certification processing with another user device can be executed using a common public key certificate.

Further objects, features, and advantages of the present invention will become apparent from the following description of the preferred embodiments with reference to the attached drawings.

BRIEF DESCRIPTION OF THE DRAWINGS

FIG. 5 is an illustration of the data structure of a public-key-certificate issuer authority in a public-key-encryption data-communication system of the present invention;

FIG. 6 is an illustration (No. 1) of the structure of a public key certificate in a public-key-encryption data-communication system of the present invention;

FIG. 7 is an illustration (No. 2) of the structure of a public key certificate in a public-key-encryption data-communication system of the present invention;

FIG. 8 is an illustration of a data structure in the database of a registration authority in a public-key-encryption data-communication system of the present invention;

FIG. 9 is an illustration (No. 1) of the structure of a revocation list in a public-key-encryption data-communication system of the present invention;

FIG. 10 is an illustration (No. 2) of the structure of a revocation list in a public-key-encryption data-communication system of the present invention;

FIG. 15 is an illustration of terms for use in a public-key-encryption data-communication system of the present invention;

FIGS. 16A and 16B are illustrations of pre-registration processing between a public-key-certificate issuer authority and a registration authority in a public-key-encryption data-communication system of the present invention;

FIG. 17 is an illustration of pre-registration processing between a public-key-certificate issuer authority and a registration authority in a public-key-encryption data-communication system of the present invention;

FIG. 26 is an illustration of specific examples of a system holder and other authorities in a public-key-encryption data-communication system of the present invention;

DESCRIPTION OF THE PREFERRED EMBODIMENTS

Embodiments of the present invention are described below with reference to the drawings.

Figure 1:
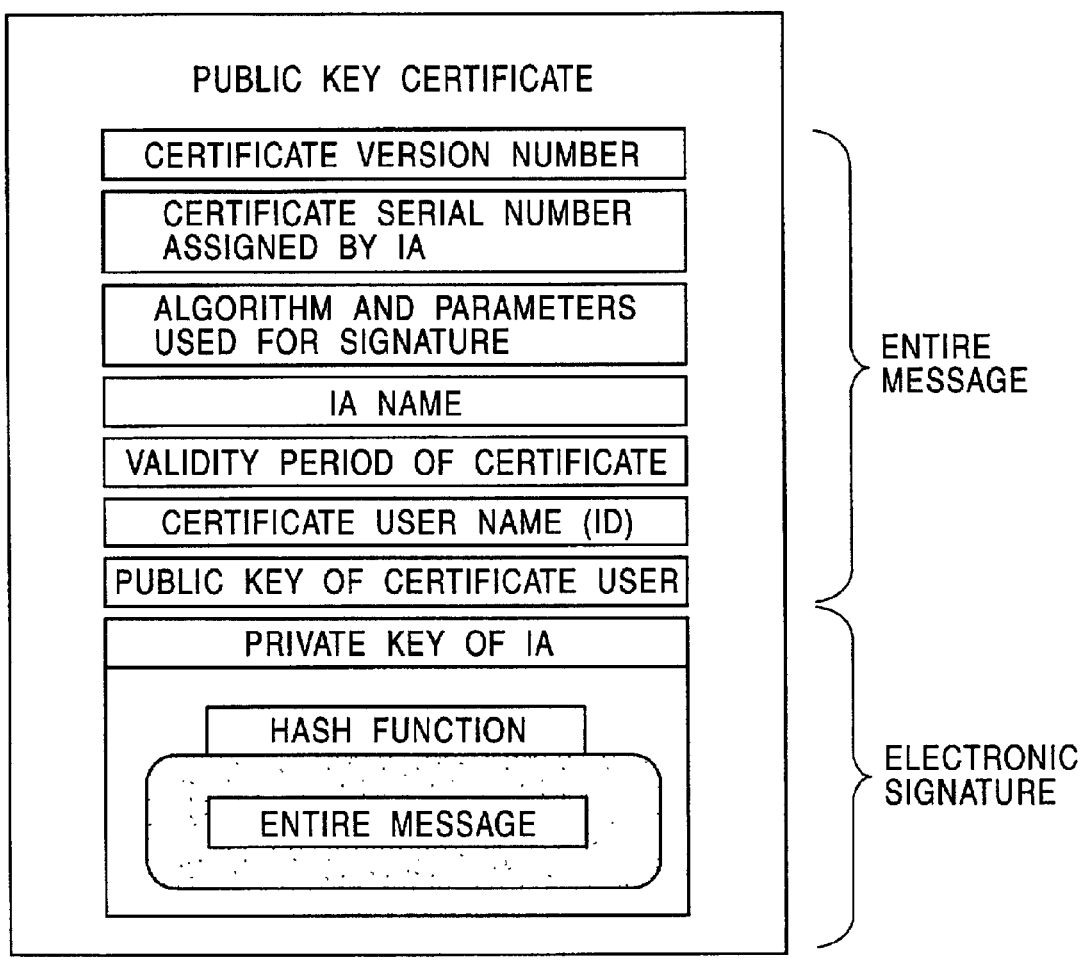
FIG. 1 is an illustration of an example of a public key certificate.
Figure 2:
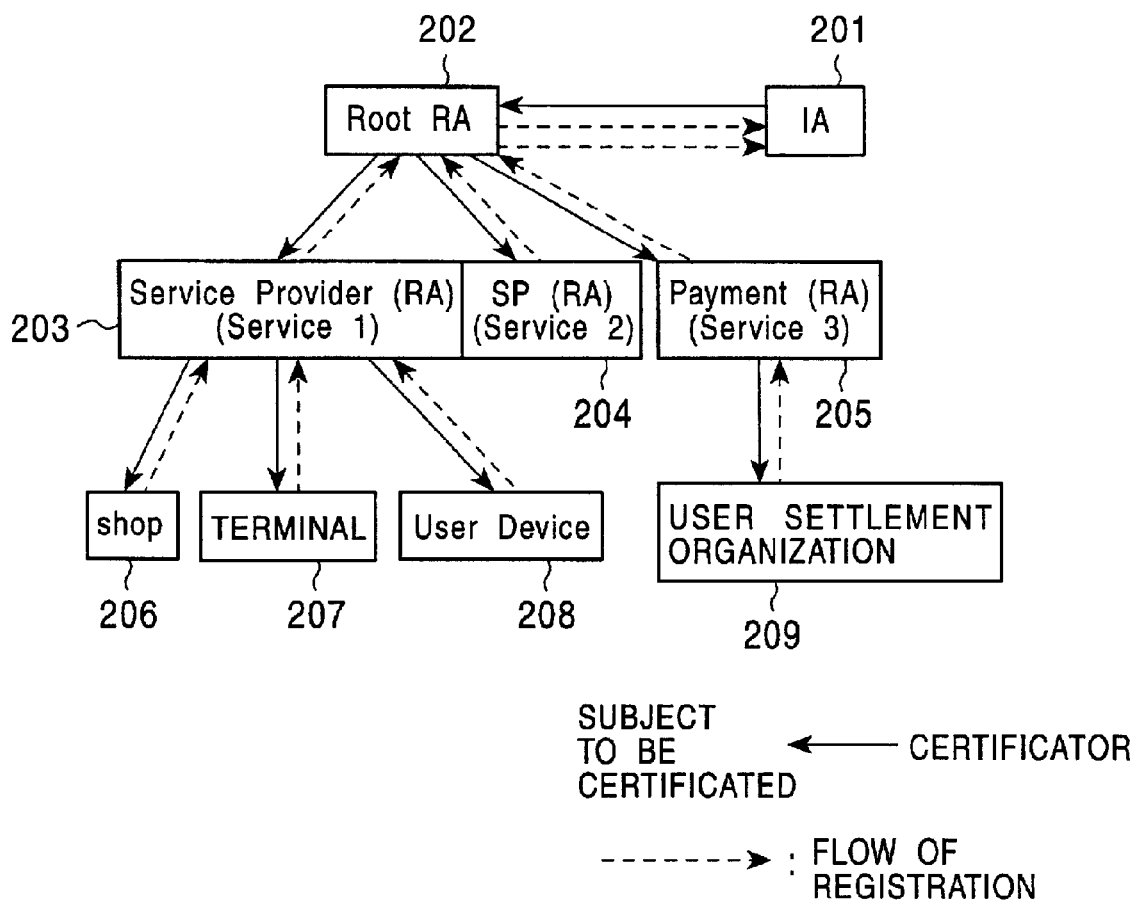
FIG. 2 is a block diagram showing an outline of public-key-encryption data-communication system of the present invention.

In FIG. 2 is shown a schematic illustration of a data communication system and a data communication method that use public-key encryption.

In FIG. 2, a shop 206, a terminal 207, a user device 208, and a user settlement organization 209 are subjects to be certificated, in other words, bodies that perform data transmission and reception based on public key encryption. Although FIG. 2 shows, as typical subjects to be certificated, one shop 206, one terminal 207, one user device 208, and one user settlement organization 209, in general, many types of these exist, and other than these, various types of subjects to be certificated can exist.

The shop 206, the terminal 207, the user device 208, and the user settlement organization 209 as subjects to be certificated, which are under control of each registration authority (also indicated by "RA" in the accompanying drawings), request registration authorities (service provider RAs) 203 and 204, and a registration authority (payment RA) 205 to issue public-key certificates corresponding to public keys they use.

The registration authorities 203, 204, and 205 certificate subjects (entities and apparatuses participating in services) in services, or certificate a payer for participators in the services (guarantee for payment). The registration authority 203, 204, and 205 also receive issuing requests on public-key certificates corresponding to public keys used by the subjects (entities, apparatuses, and users participating in the services) in the services, and transfer them to a public-key-certificate issuer authority (also indicated by an "IA" in the accompanying drawings) 201 via a root registration authority (also indicated by a "root RA" in the accompanying drawings) 202. The root registration authority 202 accepts the public-key-certificate issuing requests from the certificated registration authorities 203, 204, and 205. In other words, the root registration authority 202 accepts, as the public-key-certificate issuing requests, only requests from authorities certificated by the root registration authority 202.

In FIG. 2, the registration authorities 203 and 204 are, for example, service providers that perform provision of services for distributing contents such as music data, image data, and game programs, and the registration authority 205 is a clearing center that performs settlement processing on users' electronic money by performing data communication with the user settlement organization 209. These registration authorities shown in FIG. 2 are examples, and other than these, various types of registration authorities that provide various services can exist.

Each registration authority exists for each service (system), and the root registration authority 202 exists as one that controls and certificates the registration authorities. The root registration authority 202 is certificated by a public-key-certificate issuer authority 201, which is described below. The registration authorities 203, 204, and 205 are small-sized service bodies. When the service providers do not have registration authorities for them, the root registration authority 202 can function instead of them.

The public-key-certificate issuer authority 201 performs cross certification with the root registration authority 202 or the registration authority 203, 204 or 205, creates a public-key certificate based on a subject identifier (ID) for identifying a subject as a public-key-certificate-issuance requesting body, a subject's public key, and other information to be written in the public-key certificate, which are transferred from the root registration authority 202 or each of the registration authorities 203 to 205, and distributes the public-key certificate to the registration authorities 203 to 205.

This makes it a condition that the root registration authority 202 or each of the registration authorities 203 to 205, which requests the public-key-certificate issuer authority 201 to issue a certificate, has been certificated by the public-key-certificate issuer authority.

Also, in response to a request from the root registration authority 202 or each of the registration authorities 203 to 205, the public-key-certificate issuer authority 201 performs processing for responding to the updating, invalidation, and deletion of the public-key certificate, or to confirmation by the subject of the validity of the public-key certificate. The public-key-certificate issuer authority 201 is to be authorized by an appropriate legal organization, and is regarded as certificated after being authorized.

Figure 3:
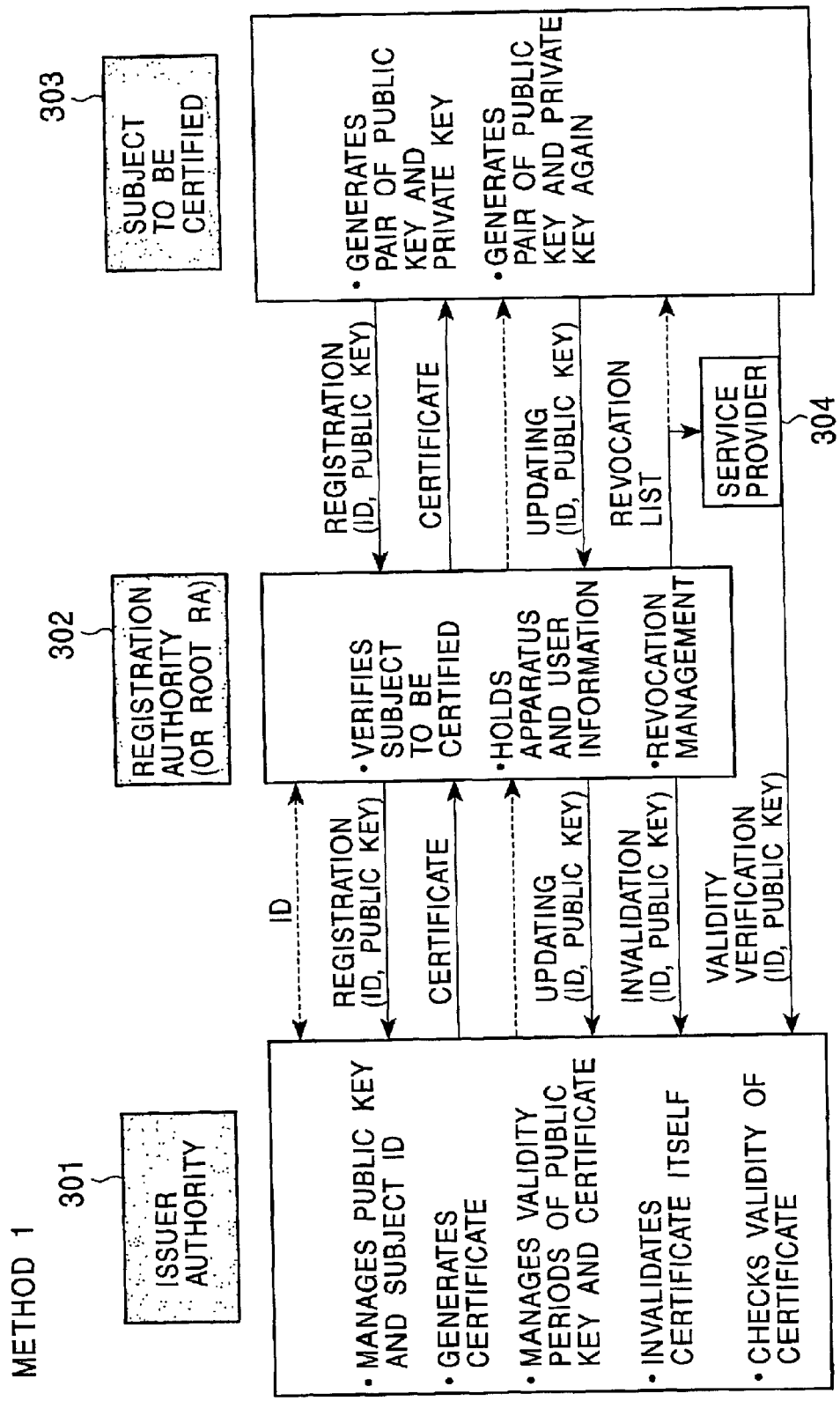
FIG. 3 is an illustration (example 1) of processes by a public-key-certificate issuer authority, a root registration authority, and a subject to be certificated in a public-key-encryption data-communication system of the present invention.
Figure 4:
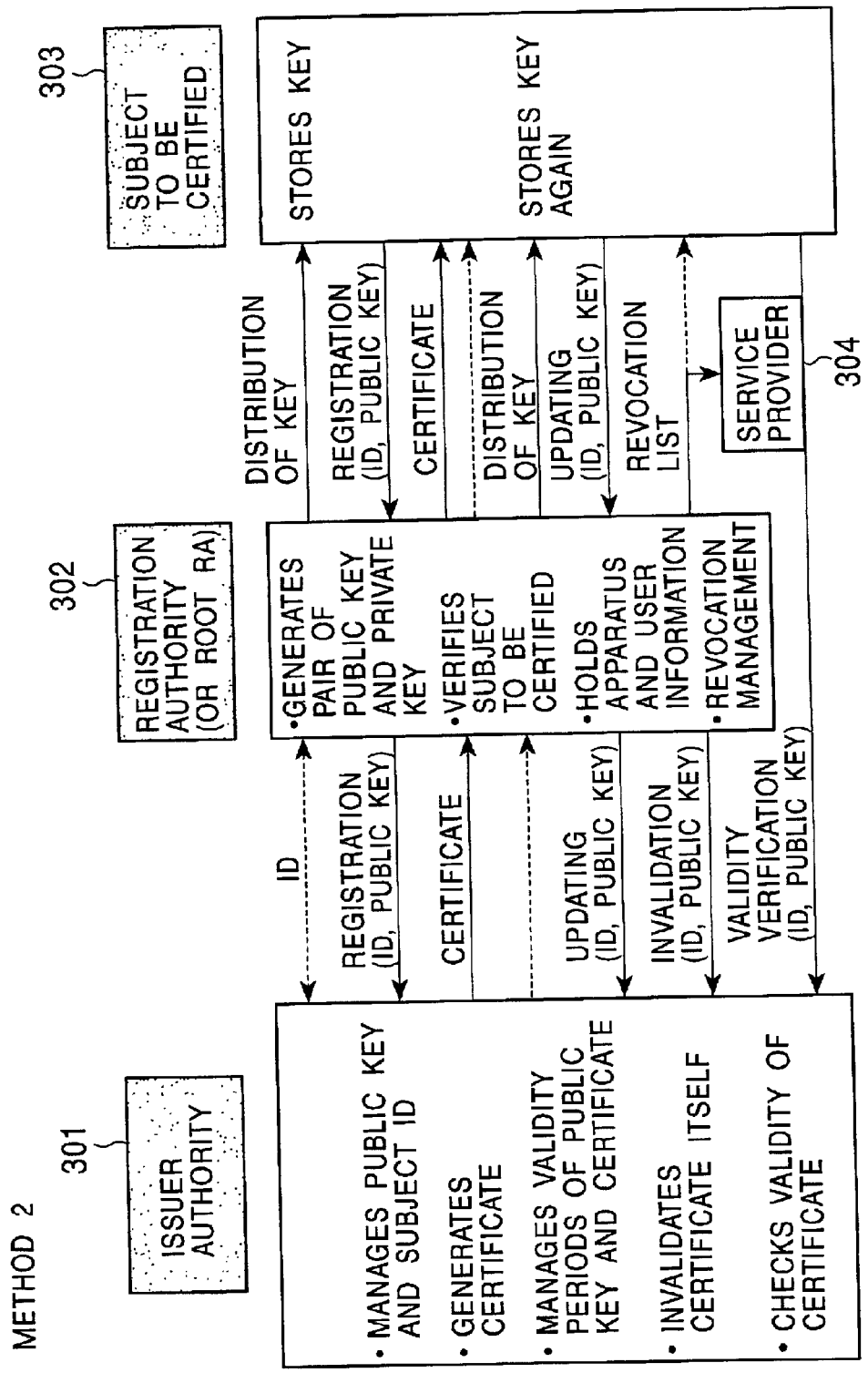
FIG. 4 is an illustration (example 2) of processes by a public-key-certificate issuer authority, a root registration authority, and a subject to be certificated in a public-key-encryption data-communication system of the present invention.

In FIGS. 3 and 4 are illustrated processes in subjects to be certificated, such as the public-key-certificate issuer authority 201, the root registration authority 202 or the registration authorities 203 to 205, the shop 206, the terminal 207, the user device 208, and the user settlement organization 209.

FIG. 3 shows a case in which the subjects to be certificated, such as the shop 206, the terminal 207, the user device 208, and the user settlement organization 209 themselves generate public keys and private keys that are applied to the public key encryption. FIG. 4 shows a case in which the root registration authority 202 or the registration authorities 203 to 205 each generate a public key and a private key. The service providers 304 shown in FIGS. 3 and 4 have no registration authority functions.

Each process shown in FIG. 3 is described. The subject to be certificated 303 generates a public key and a private key that are applied to the public key encryption, and requests the registration authority 302 to issue a certificate corresponding to the public key. At this time, the subject to be certificated 303 transmits its ID and the public key. Its ID is, for example, a user's own identifier, a user terminal identifier, or the like. When receiving the information, the registration authority 302 verifies the subject to be certificated, and subsequently transfers the received subject ID and public key to the public-key-certificate issuer authority 301. The public-key-certificate issuer authority 301 creates, based on the received subject ID and public key and on other information to be written in the public-key certificate, the public-key certificate, and distributes the certificate to the registration authority 302 via the registration authority or the root registration authority. The registration authority 302 transfers the public-key certificate to the subject to be certificated 301.

When executing updating processing after generating a new public key and a new private key, the subject to be certificated 303 transmits the newly generated public key to the registration authority 302 with its ID. After verifying the subject to be certificated 303, the registration authority 302 transfers the received subject ID and public key to the public-key-certificate issuer authority 301, the public-key-certificate issuer authority 301 creates a new public-key certificate based on the received subject ID and public key and on other information to be written in the public-key certificate, and transmits the certificate to the subject to be certificated via the registration authority or the root registration authority.

As shown in FIG. 3, the registration authority or the root registration authority 302 performs verification processing on the subject to be certificated, and the holding of apparatus information and user information, and manages revocation of an issue by the public-key-certificate issuer authority 301.

The public-key-certificate issuer authority 301 performs the management of the public key on the issued public-key certificate and the ID of the subject to be certificated, processing for issuing a public-key certificate, processing for invalidating the issued public-key certificate, and processing for checking the validity of the issued public-key certificate.

As for revocation proceedings, the public-key-certificate issuer authority 301 executes, based on a request from the registration authority or the root registration authority 302, processing for invalidating the issued public-key certificate. The registration authority or the root registration authority 302 notifies the subject to be certificated 303 and the service provider 304, which needs revocation notification, of the revocation. The revocation notification can be provided as difference data obtained by subtracting invalidator data from the revocation data by the registration authority, which manages the revocation list, or the registration authority 302.

The subject to be certificated 303 can request the public-key-certificate issuer authority 301 to verify whether its public key is usable, in other words, whether the public-key certificate is valid. In this case, the subject to be certificated 303 transmits its ID and the public key to the public-key-certificate issuer authority 301, and validity verification is performed based on public keys and the IDs of subjects to be certificated which are managed by the public-key-certificate issuer authority 301.

FIG. 4 shows the case in which the registration authority or the root registration authority 302 generates the public key and the private key. In FIG. 4, the public key and the private key, generated by the registration authority or the root registration authority 302, are transmitted to the subject to be certificated 303, and the subject to be certificated 303 stores them. The subsequent steps are similar to those in the processing in FIG. 3.

Although the public-key-certificate revocation management in FIGS. 3 and 4 is designed to be performed by the registration authority and the root registration authority 302, the revocation management may be performed by the public-key-certificate issuer authority 301.

In FIG. 5 are shown main items of data managed by the public-key-certificate issuer authority 301. "RAID" is an identifier for a registration authority to which a service is provided. "ID" is an identifier for a subject to be certificated. "PUBLIC KEY" is a public key for the subject to be certificated, and "CERTIFICATE" is a public-key certificate itself. "VALIDITY FLAG" is a flag indicating whether the public-key certificate is valid.

In FIGS. 6 and 7 is shown a format of a public-key certificate. This is an example based on Public Key Certificate Format X.509 Version 3.

"version" indicates the version of a certificate format.

"Serial Number" indicates the serial number of the public-key certificate which is set by the public-key-certificate issuer authority.

"Signature algorithm Identifier algorithm parameter" is a field in which a signature algorithm of the public-key certificate and its parameters are recorded. The signature algorithm includes elliptic curve encryption and RSA. When elliptic curve encryption is applied, parameters and a key length are recorded, and when RSA is applied, a key length is recorded.

"issuer" is a field in which an issuer of the public-key-certificate, namely, the name of the public-key-certificate issuer authority is recorded in a recognizable form (Distinguished Name).

In "validity", a start date and time, and an end date and time are recorded which constitute a certificate validity period.

In "subject", the name of a subject to be certificated, as a user, is recorded. Specifically, it is, for example, the ID of a user apparatus, the ID of a service providing body, or the like.

"subject Public Key Info algorithm subject Public key" is a field for storing a key algorithm and key information as user's public key information.

These fields are included in public-key-certificate format X.509 Version 1. The following are fields added in public-key-certificate format X.509 Version 3.

"authority Key Identifier-key Identifier, authority Cert Issuer, authority Cert Serial Number" is information for identifying a key to the public-key-certificate issuer authority, and stores a key identification number (octal number), the name of the public-key-certificate issuer authority, and an identification number.

"subject key Identifier" stores an identifier for identifying each key when a plurality of keys are certificated in the public-key certificate.

"key usage" is a field which designates a use of a key, and in which one of uses: (0) digital signature, (2) key encipherment, (1) non-repudiation, (3) data (message) encryption, (4) symmetric key transfer, (5) verification of a signature for certification, or (6) verification of signatures on the revocation list.

In "private Key Usage Period", the effective date of a private key retained by the user is recorded.

In "certificate Policies", certificate issuance policies of the certificate authority, or the public-key certificate issuer authority and the registration authority are recorded. They mean, for example, a policy ID in accordance with ISO/IEC 9384-1, or a certificate standard.

"policy Mapping" is a field used only when the CA (public-key-certificate issuer authority) is certificated, and defines the policies of the public-key certificate issuer authority and the mapping of the policies to be certificated.

"supported algorithms" defines the attribute of a directory (X.500). This is used such that, when another system with which communication is established uses directory information, its attribute is posted beforehand.

"subject Alt Name" is a field in which another name of the user is recorded.

"issuer Alt Name" is a field in which another name of the certificate issuer is recorded.

"subject Directory Attribute" is a field in which user's arbitrary attributes are recorded.

"basic Constraint" is a field for determining whether the public key to be certificated is for signing by the certificate authority (public-key-certificate issuer authority) or is of the user.

"name Constraints permitted Subtrees" is a field indicating the effective range of a certificate used only when a subject to be certificated is the certificate authority (public-key-certificate issuer authority).

"policy Constraints" describes a specific certificate policy ID corresponding to the remainder of certificate paths, and a prohibition policy map.

"Certificate Revocation List Distribution Points" is a field to describe reference points of the revocation list (see FIG. 9) that is used to confirm whether the certificate has been revoked when the user uses the certificate.

"signature" is a field for a signature of a public-key-certificate issuer (public-key-certificate issuer authority).

In FIG. 8, the data structure of an entity database in the registration authorities in FIGS. 3 and 4 is shown. The entity database is designed to manage subjects to be certificated.

"ID" is a field storing the identifiers of the subjects to be certificated.

In "certificate data", information required for certificating the subjects to be certificated, for example, user terminal IDs when user terminals are to be certificated, etc., are recorded.

In "certification results", last certification results are recorded.

In "revocation information", pointer information to the revocation list are recorded.

In FIGS. 9 and 10 are shown format examples (based on X.509 V2) of the revocation lists. FIG. 9 shows common items, and FIG. 10 shows information managed by each certificate. Each item is described.

"signature Algorithm Identifier" describes a signature algorithm about a signature to be applied. For example, it is elliptic curve encryption or RSA.

In "Issuer", the issuer of the revocation list is recorded. In the examples in FIGS. 3 and 4, the name of the registration authority is recorded.

In "This Update", the issuance date and time of the revocation list is recorded.

In "Next Update", the next date and time of the updating of the revocation list is recorded.

In "Version", the version of the revocation list is recorded.

"authority Key Identifier-key Identifier, authority Cert Issuer, authority Cert Serial Number" is information for identifying a key to the public-key-certificate issuer authority, and stores a key identification number (octal number), the name of the public-key-certificate issuer authority, and a certificate number.

In "CRL Number", the issuance serial number of the revocation list is recorded.

In revocation list information ("Issuing distribution point"), various types of information on the revocation list are recorded: a distributor name ("Distribution point"), information ("only contains user certs") on whether the revocation list is used dedicatedly for subscriber revocation, information on whether the revocation list is used dedicatedly for revocation of the certificate by the certificate authority (in this embodiment, the public-key-certificate issuer authority), and information ("only some reasons") on whether there are other revocation reasons, and whether the revocation list is an indirect revocation list ("indirect CRL"). The indirect revocation list ("indirect CRL") is a form in which the management of information on revocation reasons and the management of the revocation list are performed by separate organizations. For example, in a case in which the root registration authority issues the revocation list, and the public-key-certificate issuer authority manages the public-key-certificate issuer authority, the form is defined as the indirect revocation list (indirect CRL). In this case, revocation information storing points, for example, data that represent IA identifiers are stored. According to the construction of the present invention, the revocation list is generated as the indirect revocation list (indirect CRL), and the information on revocation reasons is managed not by a revocation list issuer but by the public-key-certificate issuer authority.

In a CRL identifier difference ("Delta CRL Indicator"), data on whether the revocation list is distributed as a difference list are recorded. The difference list is a list structure in which public-key information on determined revocation, extracted from public-key information on revocation options, is designed to be providable to a related provider.

FIG. 10 is an illustration of information managed by each certificate.

In "certificate Serial Number", a certificate number is recorded.

In "Revocation Date", the date and time of acceptance of an application for revocation is recorded.

The fields in so far are fields defined in version 1, and the following ones are fields defined in Version 2.

"Reason code" is a field to describe revocation reasons. Revocation reasons are as follows: 0: reason unknown; 1: subscriber compromised; 2: CA (public-key-certificate issuer authority) key compromised; 3: certificate information has changed; 4: the certificate has got replaced; 5: suspension of use; 6: temporary suspension of use; and 7: release of temporary suspension state.

"Hold instruction code" describes a method of coping with the temporary suspension of use.

"Invalidity date" describes a date and time at which the private key may have been damaged.

"certificate issuer" describes the name of the certificate authority. However, in the case of the indirect revocation list, revocation information is not managed by the revocation list issuer authority. Accordingly, a designated revocation information management CA (e.g., the public-key-certificate issuer authority) is used to make a detour, in other words, a pointer to the IA is set.

"signature" is a signature of the revocation list issuer.

An electronic signature and cross certification processing, used in the public-key-certificate issuing system and data communication method of the present invention, are described. After describing the electronic signature and cross certification processing, details of specific processing in the public-key-certificate issuing system of the present invention are described below with reference to the drawings.

Electronic Signature

Figure 11:
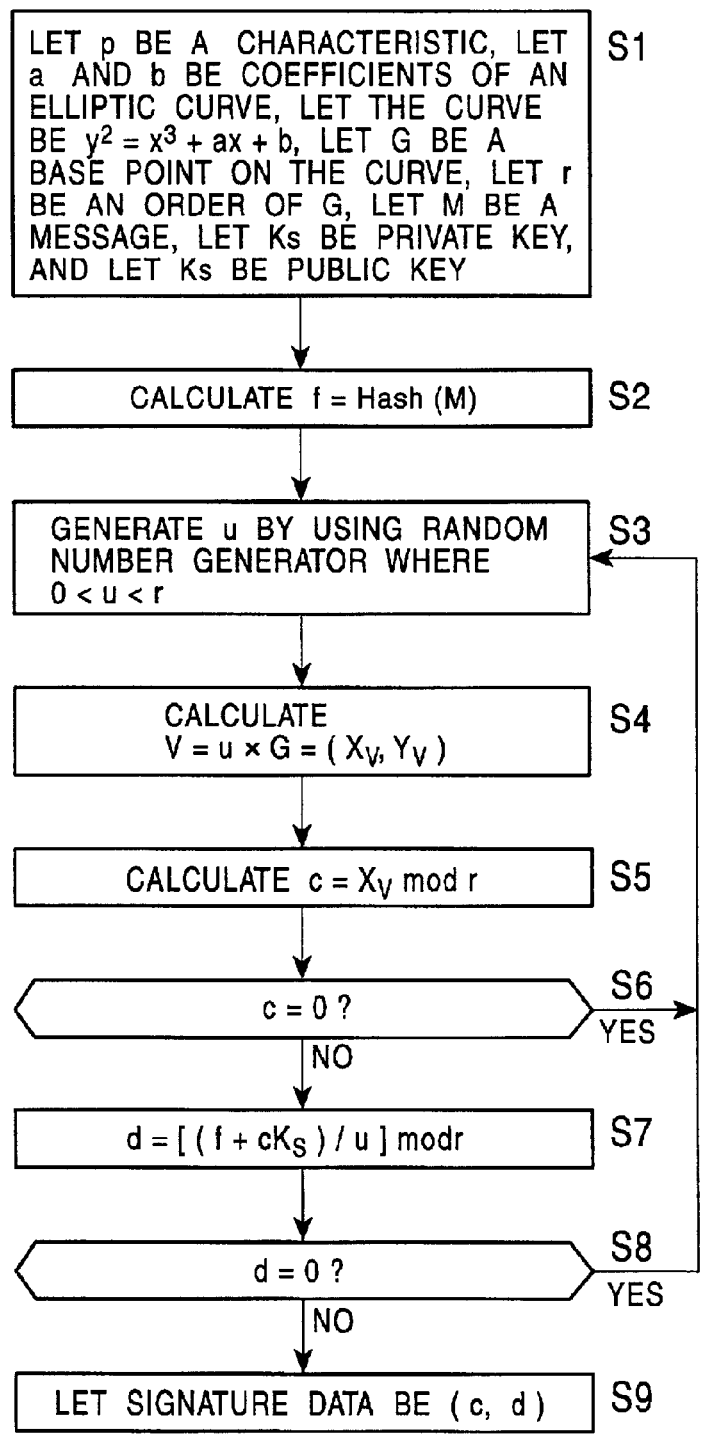
FIG. 11 is a flowchart illustrating sign generating processing applicable to a public-key-encryption data-communication system of the present invention.

A method of generating an electronic signature by using the public key encryption is described below with reference to FIG. 11. The process shown in FIG. 11 is a process flow of generating electronic signature data using EC-DSA ((Elliptic Curve Digital Signature Algorithm), IEEE P1363/D3). Here, an example that uses the Elliptic Curve Cryptography (hereinafter referred to as the ECC) as the public key encryption is described. In the data processing according to the present invention, in addition to the elliptic curve cryptography, for example, the RSA encryption ((Rivest, Shamir, Adleman), etc., (ANSI X9.31)) in a similar public key encryption may be used.

The steps in FIG. 11 are described. In step S1, a characteristic is represented by p, coefficients of an elliptic curve (elliptic curve: $y^2=x^3+ax+b$) are represented by a and b, a base point on the elliptic curve is represented by G, an order of G is represented by r, and a private key is represented by Ks ($0<Ks<r$). In step S2, a hash value of message M is calculated, and it is assumed that f=Hash(M).

Here, a method of finding a hash value by using the hash function is described. The hash function is a function in which an input message is compressed into data having a predetermined bit length and the data is output as a hash value. The hash function has features in that it is difficult to predict an input from a hash value (output), in that many bits of the hash value are changed when one bit of data input to the hash function, and in that it is difficult to find out different input data having the same hash value. As the hash function, MD4, MD5, SHA-1, or the like, may be used, or DES-CBC may be used. In this case, MAC (check value: corresponding to ICV) that is used as a final output value becomes a hash value.

Subsequently, in step S3, a random number u ($0<u<r$) is generated, and in step S4, coordinates V (Xv, Yv) that is obtained by multiplying the base point by u times is calculated. Addition and doubling on the elliptic curve are defined as follows:

If P=(Xa, Ya), Q=(Xb, Yb), and R=(Xc, Yc)=P+Q, when P≠Q (addition), $$Xc=\lambda^2-Xa-Xb$$

$$Yc=\lambda\times(Xa-Xc)-Ya$$

$$\lambda=(Yb-Ya)/(Xb-Xa)$$

when P=Q (doubling), $$Xc=\lambda^2-2Xa$$

$$Yc=\lambda\times(Xa-Xc)-Ya$$

$$\lambda=(3(Xa)^2+a)/(2Ya)$$

Using these, a value that is u times the point G is calculated (although the speed is slow, the following is used as the most understandable operation method: G, 2×G, and 4×G are calculated, u is expanded in binary number, and corresponding $2^i \times G$ (a value obtained by doubling G i times (i is a bit position counted from the LSB of u)) is added to a position having 1.

In step S5, c=Xv mod r is calculated, and in step S6, it is determined whether this value is zero. If this value is not zero, d=[(f+cKs)/u] mod r is calculated in step S7, and it is determined in step S8 whether d is zero. If d is not zero, in step S9, c and d are output as electronic signature data. If it is assumed that r has a bit length of 160 bits, the electronic signature data has a bit length of 320 bits.

If c is zero in step S6, the process proceeds back to step S3, and generates a new random number again. Similarly, if d is zero in step S8, the process proceeds back to step S3, and generates a random number again.

Figure 12:
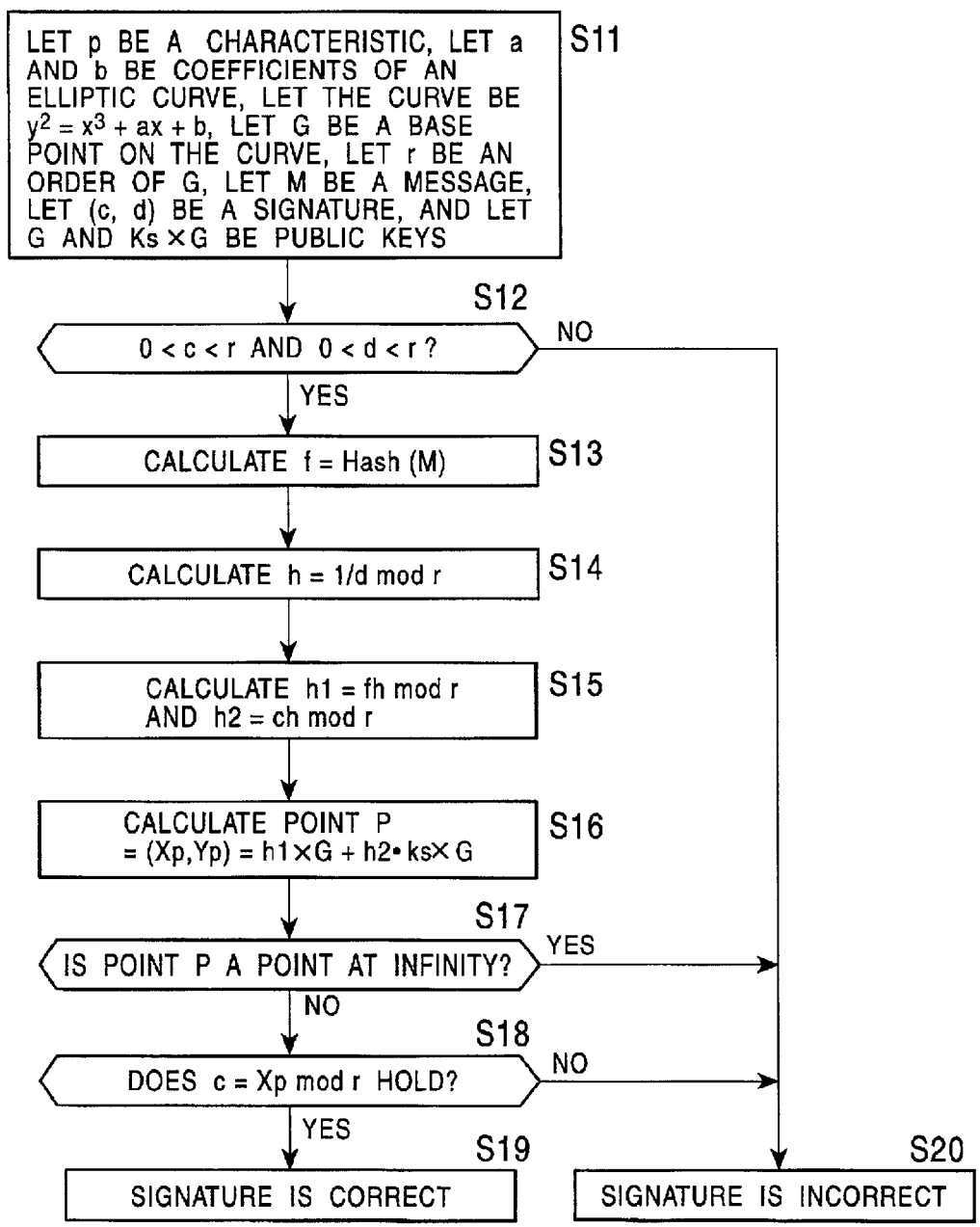
FIG. 12 is a flowchart illustrating sign generating processing applicable to a public-key-encryption data-communication system of the present invention.

Next, a method of verifying the electronic signature by using the public key encryption is described below with reference to FIG. 12. In step S11, a message is represented by M, a characteristic is represented by p, coefficients of an elliptic curve (elliptic curve: $y^2=x^3+ax+b$) are represented by a and b, a base point on the elliptic curve is represented by G, an order of G is represented by r, and G and Ks×G are used as a public key ($0<Ks<r$). In step S12, it is determined whether electronic signature data c and d satisfy $0<c<r$ and $0<d<r$. If these conditions are satisfied, in step S13, a hash value of the massage M is calculated, and it is assumed that f=Hash(M). Next, in step S14, h=1/d mod r is calculated, and in step S15, h1=fh mod r and h2=ch mod r are calculated.

In step S16, using the already calculated h1 and h2, point P=(Xp, Yp)=h1×G+h2·Ks×G is calculated. Since an electronic signature verifier knows public keys G and Ks×G, the verifier can perform calculation of multiplying a point on the elliptic curve by a scalar times, similarly to step S4 in FIG. 11. In step S17, it is determined whether the point P is a point at infinity. If the point P is not a point at infinity, the process proceeds to step S18 (actually, determination on the point at infinity can be performed in step S16. In other words, addition for P=(X, Y) and Q=(X, −Y) makes it impossible to calculate λ, and it is found that P+Q is a point at infinity). In step S18, Xp mod r is calculated, and is compared with electronic signature data c. When these values are finally identical, the process proceeds to step S19, and determines that the electronic signature is correct.

If the process has determined that the electronic signature is correct, the data is not manipulated, and it is found that a person who retains a private key corresponding to the public key has generated the electronic signature.

If the electronic signature data c or d does not satisfy $0<c<r$ or $0<d<r$, the process proceeds to step S20. Also if the process has determined in step S17 that the point P is a point at infinity, it proceeds to step S20. Also if the value of Xp mod r is not coincident with the electronic signature data c, the process proceeds to step S20.

If the process has determined in step S20 that the electronic signature is not correct, it is found that the data is manipulated and it is found that a person who retains a private key corresponding to the public key has not generated the electronic signature.

Cross Certification

Between two means executing data transmission and reception, after both verifies each other as a correct data communicator, both transfer necessary data to each other. Verification processing on whether both means are correct data communicators is cross certification processing. It is one preferred data transfer method that, after the generation of a session key is performed in the cross certification processing, data transmission is performed executing encryption processing with the generated session key as a public key.

Figure 13:
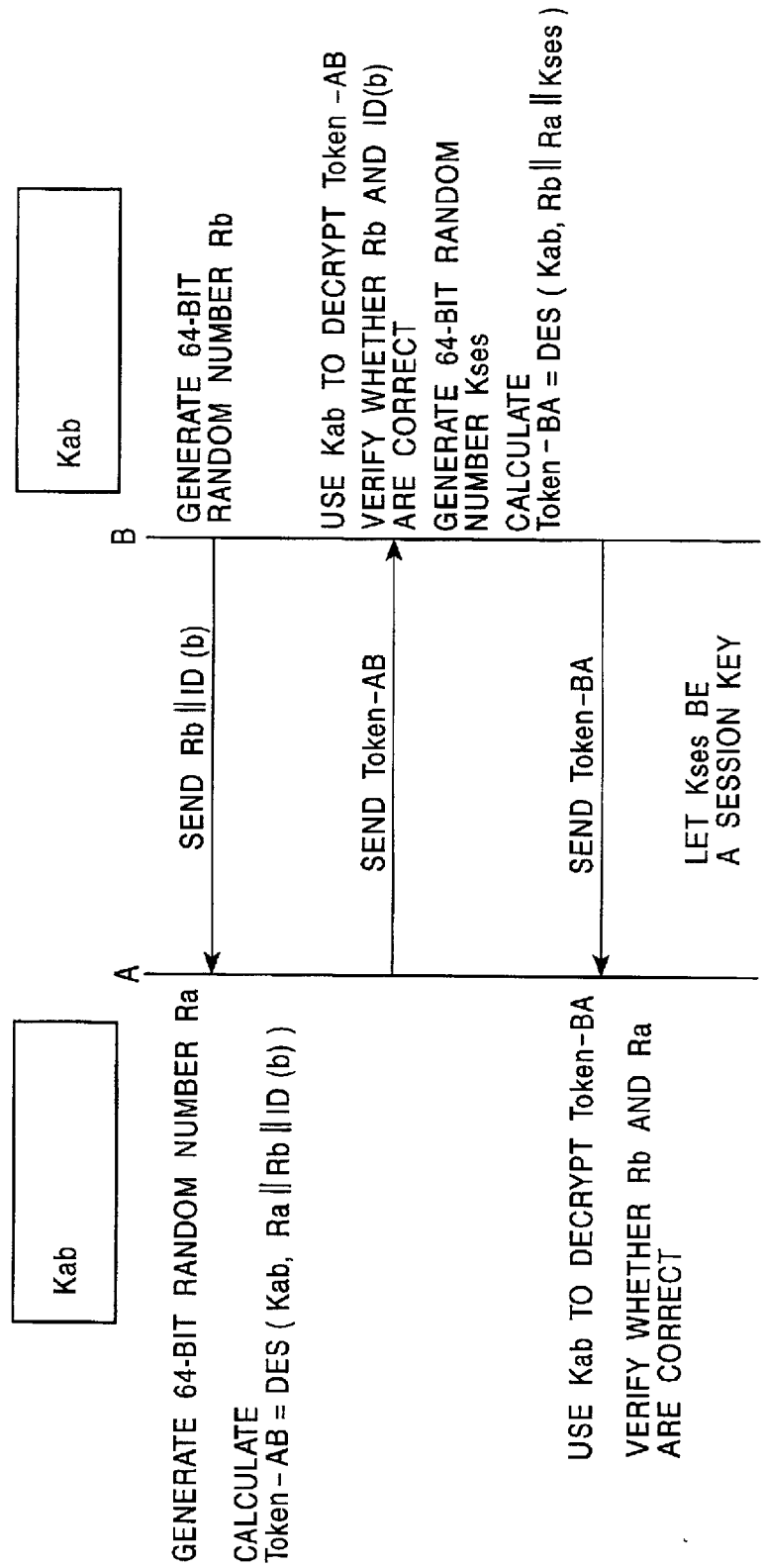
FIG. 13 is an illustration of cross certification processing applicable to a public-key/symmetric-key-encryption data-communication system of the present invention.

Cross certification using the public key encryption is described below with reference to FIG. 13. In FIG. 13, DES is used as the public key encryption, but a similar type of public key encryption may be used.

At first, "B" generates a 64-bit random number Rb, and transmits Rb and ID(b) that is an ID of itself to A. When receiving theses, "A" generates another 64-bit random number Ra, and uses key Kab in the CBC mode of DES to encrypt the data in the order of Ra, Rb, and ID(b), and sends the encrypted data back to B.

When receiving the encrypted data, B uses the key Kab to decrypt the received data. In a method of encrypting the received data, first, by using the key Kab to decrypt a ciphertext E1, the random number Ra is obtained. Second, by using the key Kab to decrypt a ciphertext E2, and performing exclusive logical addition of the decrypted result and E1, Rb is obtained. Finally, by using the key Kab to decrypt a ciphertext E3, and performing exclusive logical addition of the decrypted result and E2, ID(b) is obtained. Among Ra, Rb, and ID(b) obtained as described above, B verifies whether Rb and ID(b) are identical to those transmitted by B. If the verification is affirmative, B certificates that A is correct.

Next, B generates a Session Key (hereinafter referred to as a Kses) that is used after the certification (the generating method uses a random number). B uses the key Kab in the CBC mode of DES to encrypt Rb, Ra, and Kses in the order given, and sends the encrypted data back to A.

When receiving these, A uses the key Kab to decrypt the received data. Since a method of decrypting the received data is similar to that performed by B, its details are omitted. Among Rb, Ra, and Kses obtained as described above, A verifies whether Rb and Ra are identical to those transmitted by A. If the verification is affirmative, A certifies that B is correct. After both certificate each other, the session key Kses is used as a symmetric key for secret communication after the certification is performed.

If incorrectness and inconsistency are found when verifying the received data, the cross certification is regarded as failing, and processing is discontinued.

Figure 14:
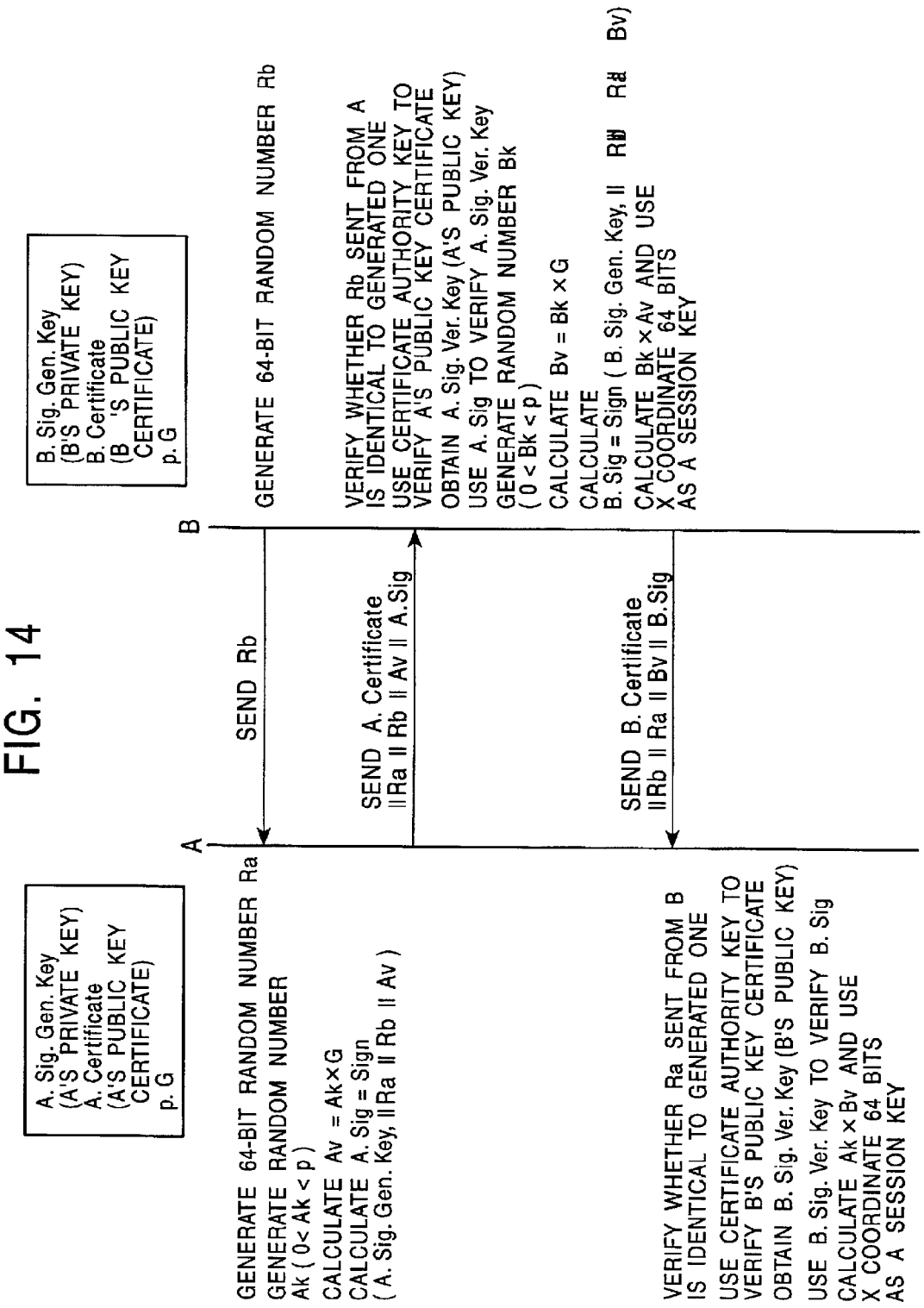
FIG. 14 is an illustration of cross certification processing applicable to a public-key-encryption data-communication system of the present invention.

Next, a cross certification method using a 160-bit elliptic curve encryption as a public-key encryption method is described with reference to FIG. 14. In FIG. 14, ECC is used as a public-key encryption method, but a similar public-key encryption method may be used as described above. Also the key size may not be 160 bits. In FIG. 14, first, B generates and transmits 64-bit random number Rb to A. When receiving it, A newly generates 64-bit random number Rb and random number Ak smaller than characteristic p. A finds point Av=Ak×G, which is Ak times the base point G, and generates and sends electronic signature A.Sig corresponding to Ra, Rb, and Av (X coordinate and Y coordinate) back to B, with a public key certificate of A. Here, Ra and Rb each have 64 bits, and the X coordinate and Y coordinate of Av each have 160 bits. Thus, an electronic signature corresponding to a total of 448 bits is generated. Since the electronic signature generating method has been described with reference to FIG. 11, its details are omitted.

When using a public key certificate, the user uses a public key of the public-key-certificate issuer authority 410, which is retained by the user, to verify an electronic signature of the public key certificate. After succeeding in the verification of the electronic signature, the user extracts the public key from the public key certificate, and uses the obtained public key. Accordingly, all users who use the public key certificate must retain public keys of a common public-key-certificate issuer authority. Since the electronic signature verifying method has been described with reference to FIG. 12, its details are omitted.

Referring back to FIG. 2, the description is continued. When receiving the public key certificate of A, Ra, Rb, Av, and the electronic signature A.Sig, B verifies whether Rb transmitted from A is identical to that sent by A. As a result, if the verification is affirmative, B uses a public key of the certificate authority to verify the electronic signature in the public key certificate of A, and extracts the A's public key. B uses the extracted public key of A to verify the electronic signature A.Sig. Since the electronic signature verifying method has been described with reference to FIG. 12, its details are omitted. After succeeding in the verification of the electronic signature, B certifies that A is correct.

Nest, B generates random number Bk smaller than characteristic P. B finds point Bv=Bk×G, which is a value obtained by multiplying base point G by Bk times, and generates and sends electronic signature B.Sig that corresponds to Rb, Ra, and Bv (X coordinate and Y coordinate) back to A, with a public key certificate of B.

When receiving the public key certificate of B, Rb, Ra, Av, and the electronic signature B.Sig, A verifies whether Ra transmitted by B is identical to that generated by A. As a result, if both are identical, A uses the public key of the certificate authority to verify the electronic signature in the public key certificate of B, and extracts the public key of B. A uses the extracted public key of B to verity the electronic signature B.Sig. After succeeding in the verification of the electronic signature, A verifies that B is correct.

When both succeed in certification, B calculates Bk×Av (although Bk is a random number, it is required to perform multiplication by a scalar times since Av is a point on the elliptic curve), A calculates Ak×Bv, and the lower 64 bits of the X coordinates of these points are used as a session key for subsequent communication (in a case in which the symmetric encryption is designed to symmetric encryption using a 64-bit key length). Definitely, the session key may be generated from the Y coordinates, and the lower 64 bits may not be used. In secret communication after the cross certification, in addition to session-key encryption, an electronic signature may be put on transmission data.

When incorrectness and inconsistency are found in the verification of the electronic signature and the verification of the received data, the cross certification is regarded as failing, and the processing is discontinued.

In the above-described cross certification processing, the generated session key is used to encrypt transmission data, and mutual data communication is executed.

In FIG. 15 is shown descriptions of terms that are used in the following description and that are related to the public-key-certificate issuing system and the data communication method of the present invention. These are briefly described. A key is represented by K, P is added as a suffix to mean a public key, S is added as a suffix to mean a private key, and an owner identifier (e.g., a) is added. A session key that is generated in cross certification for use in encryption and decryption processing is represented by Ks. A public key certificate of B, issued by A, is represented by A<<B>>. Concerning the encryption of data, for example, data encrypted using the session key Ks is represented by $E_{Ks}$(data). Similarly, decrypted data is represented by $D_{Ks}$(data). Concerning signature processing, for example, data signed using the private key Ksa of A is represented by {data}Sig·Ksa. Concerning encrypted signed data, what is obtained by using the session key Ks to encrypt "data| |signature" that is generated by signing data using the private key Ksa of A is represented by $E_{Ks}$({data}Sig·Ksa).

FIGS. 16A and 16B show processes executed in the process of registering the root registration authority. FIG. 16A shows an online case, and FIG. 16B shows an offline case. Processing order is indicated by numbers. The online case in FIG. 16A is described. In the online case, between the root registration authority 1601 and the public-key-certificate issuer authority 1602, the cross certification described with reference to FIGS. 13 and 14 is executed using a pair of public keys of the root registration authority which are transferred to the root registration authority beforehand via another route which is not shown, whereby both recognizes each other for communication, and the session key Ks is generated.

After the cross certification processing ends, the root registration authority 1601 generates its public key and private key, and requests the public-key-certificate issuer authority 1602 to issue a public key certificate corresponding to the generated public key. The request for issuing the certificate is performed such that the root registration authority 1601 transfers, to the public-key-certificate issuer authority 1602, $E_{Ks}$({RootRAID, KpRootRA'}$_{Sig·KsRootRA}$) that is data encrypted using the session key Ks for the identifier RootRAID of the root registration authority 1601 and the public key KpRootRA' of the root registration authority 1601.

After decrypting the received encrypted data $E_{Ks}$ ({RootRAID, KpRootRA'}$_{Sig·KsRootRA}$), and verifying the signature, the public-key-certificate issuer authority 1602 stores the public key KpRootRA' of the root registration authority 1601 as data to be managed in a database. In other words, the public-key-certificate issuer authority 1602 stores it as data in the database previously described with reference to FIG. 5.

In response to the certificate issuing request from the root registration authority 1601, the public-key-certificate issuer authority 1602 generates the public key certificate. This is a public key certificate in accordance with the formats in FIGS. 6 and 7. The public-key-certificate issuer authority 1602 stores the generated public key certificate in the database for management (see FIG. 5). Also, by signing the public key certificate of the root registration authority 1601 which is issued by the public-key-certificate issuer authority 1602, namely, IA<<RootRA>> by using the private key KsIA of the public-key-certificate issuer authority 1602, and encrypting it using the session key Ks generated in the previous cross certification, the public-key-certificate issuer authority 1602 generates the data $E_{Ks}$ ({IA<<RootRA>>}$_{Sig·KsIA}$), and transmits the generated data to the root registration authority 1601. The root registration authority 1601 stores the transmitted data. Secret information both have in common beforehand may be a symmetric key. In this case, SigKsRootRA is an MAC value with the symmetric key used.

When the public-key-certificate issuer authority 1602 uses the registration authority to directly issue the public key certificate without using the root registration authority, the processing is such that the root registration authority 1601 in FIG. 16 is replaced by the registration authority.

FIG. 16B shows an offline case in which the registering process is executed via a storage medium, for example, a DVD, a CD, a memory card, etc. In the offline process case, the processing is executed by storing, in a storage medium, the information described about the offline process.

FIG. 17 shows an example of a procedure performed when a registration authority 1701 performs the issuance of a public key certificate in a case in which, under management by the root registration authority 1601, there is the registration authority 1701, which operates as, for example, a service provider providing a service of distributing contents such as music data and image data, or as a service provider performing processing for electronic money settlement. The example is described in the order of the procedure.

First, cross certification processing is executed between the registration authority 1701 and the root registration authority 1601. This is executed using, for example, cross certification keys (corresponding to the key Kab described with reference to FIG. 13) that are stored beforehand the memories of the registration authority 1701 and the root registration authority 1601.

Second, the registration authority 1701 signs the identifier SPID of the registration authority 1701 using its private key $K_{sSP}$, generates the data $E_{Ks}(\{SPID\}_{Sig \cdot KsSP})$ by performing encryption using the session key Ks generated in the cross certification, and transmits the generated data to the root registration authority 1601. After using the session key Ks to decrypt the received data and verifying the signature, the root registration authority 1601 recognizes the signature and executes the signing of the recognition result, and performs encryption using the session key and executes recognition responding to the registration authority 1701.

When receiving the recognition response from the root registration authority 1601, the registration authority 1701 generates its public key and private key, signs the public key KpSP' using its private key, and encrypts the signed public key using the session key to generate the data $E_{Ks}(\{KpSp'\}_{Sig \cdot KsSP})$. The registration authority transmits the generated data to the root registration authority 1601. When receiving the data, the root registration authority 1601 executes the requesting of the public-key-certificate issuer authority 1602 to issue a public key certificate of the registration authority 1701. Cross certification processing is performed between the root registration authority 1601 and the public-key-certificate issuer authority 1602.

When certification is established in the cross certification processing, the root registration authority 1601 executes the signing of the identifier SPID of the registration authority 1701 and the public key KpSp of the registration authority 1701 by using the private key of the root registration authority 1601, generates $E_{Ks}(\{SPID, KpSP'\}_{Sig \cdot KsRootSP})$ by performing encryption using the session key generated in the cross certification, and transmits the generated data to the public-key-certificate issuer authority 1602.

The public-key-certificate issuer authority 1602 decrypts the received data $E_{Ks}(\{SPID, KpSP'\}_{Sig \cdot KsRootSP})$, and stores the public key KpSP of the registration authority 1701 as management data in a database. In other words, it is stored as data in the database described with reference to FIG. 5.

The public-key-certificate issuer authority 1602 further generates a public key certificate of the registration authority 1701. This is a public key certificate in accordance with the formats in FIGS. 6 and 7. The public-key-certificate issuer authority 1602 stores the generated public key certificate in the database for management (see FIG. 5). The public-key-certificate issuer authority 1602 also uses the private key KsIA of the public-key-certificate issuer authority 1602 to sign the public key certificate of the registration authority 1701, namely, IA<<SP>>, which is issued by the public-key-certificate issuer authority 1602, generates the data $E_{Ks}(\{IA<<SP>>\}_{Sig \cdot KsIA})$ by performing encryption using the session key Ks2 generated in the cross certification processing, and transmits the generated data to the root registration authority 1601. The root registration authority 1601 verifies the signature, uses its private key to perform sign the received data, and encrypts the signed data using a session key (the session key generated in the cross certification processing executed between the registration authority 1701 and the root registration authority 1601). The root registration authority 1601 transmits the encrypted data to the registration authority 1701. After using the session key to decrypt the received data, and verifying the signature, the registration authority 1701 stores the certificate.

In the above-described procedure, by omitting (5) the key generating process, the key that is embedded in a device of the registration authority 1701 may be used as a public key. In addition, by performing cross certification in which an initially embedded key is used as a symmetric key, a signature on (2) the data may be an MAC generated using the symmetric key.

Figure 18:
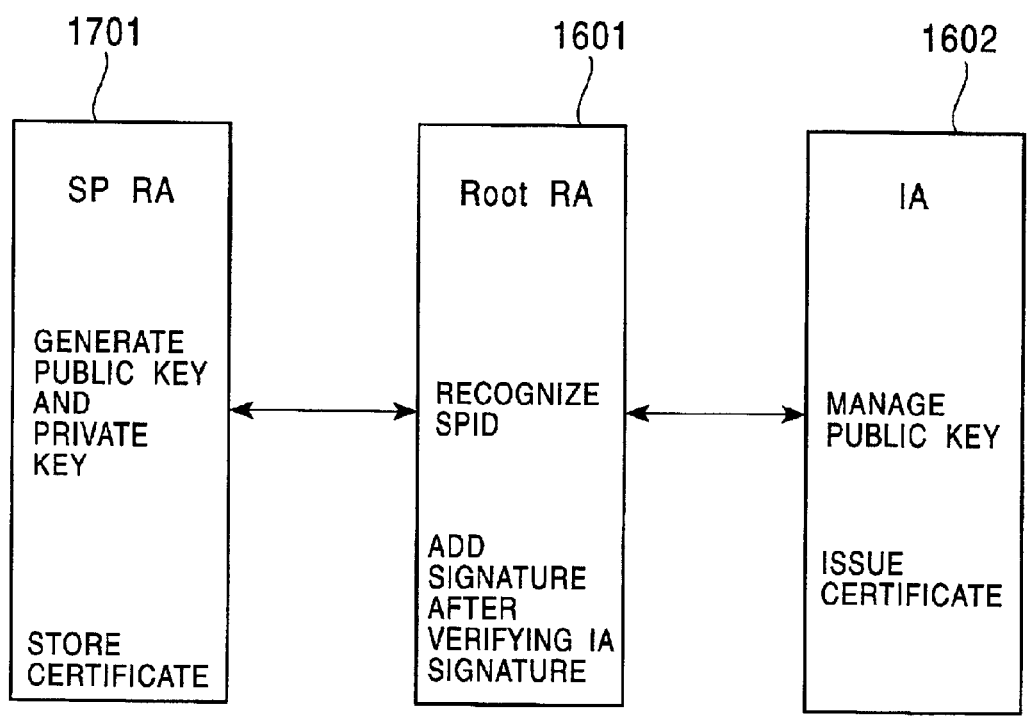
FIG. 18 is an illustration of offline processing among a public-key-certificate issuer authority, a registration authority, and a user in a public-key-encryption data-communication system of the present invention.

FIG. 18 illustrates a construction in which the process, which is described with reference to FIG. 17, of issuing the public key certificate of the registration authority 1701 is executed in offline. The data transmitted between the authorities are processed such that they are exchanged using various storage media, for example, a DVD, a CD, a memory card, etc. In the offline process case, the information that is described about the offline process is stored in a storage medium for processing.

Figure 19:
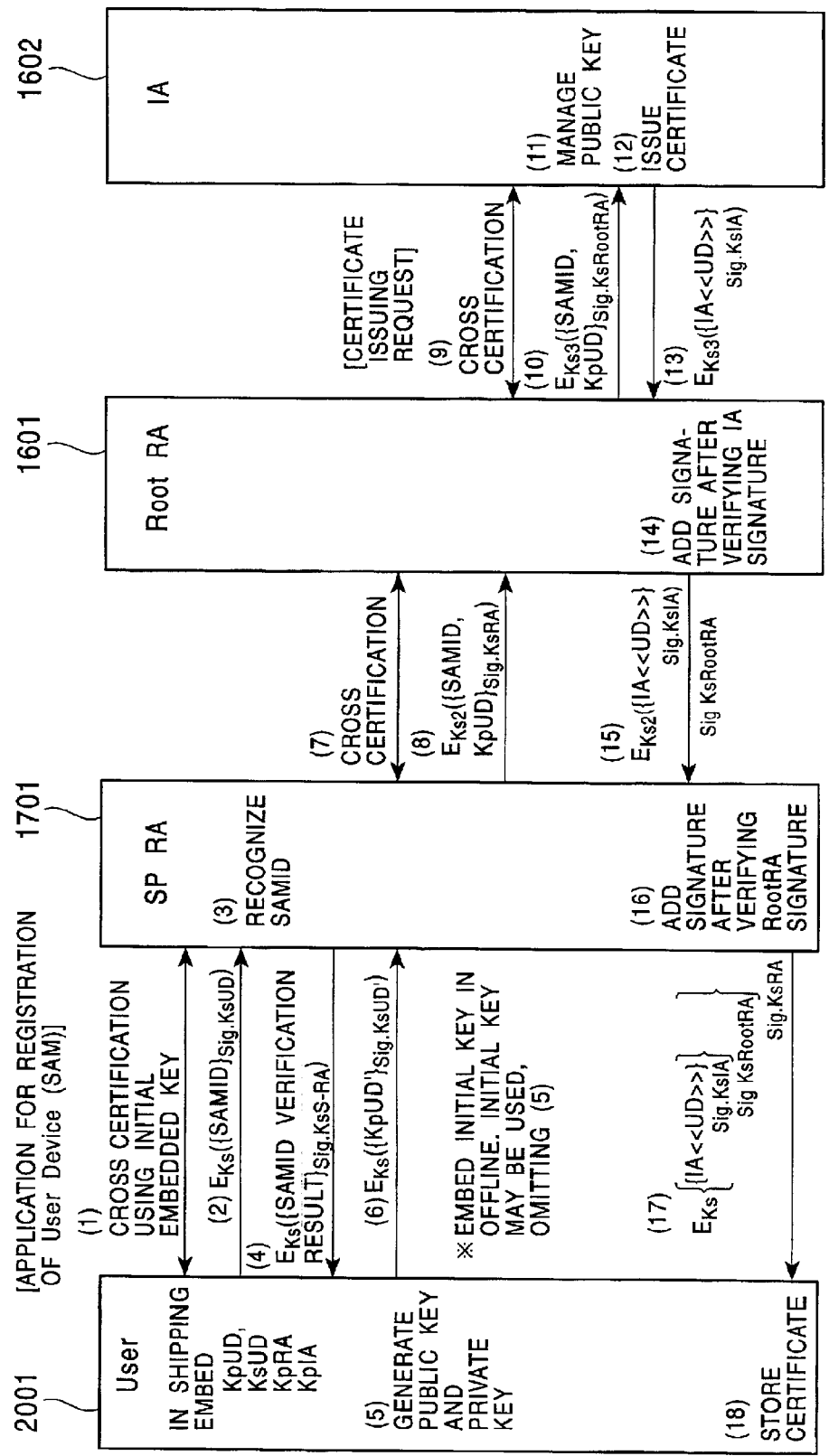
FIG. 19 is an illustration of processing among a public-key-certificate issuer authority, a root registration authority, a registration authority, and a user in a public-key-encryption data-communication system of the present invention.

FIG. 19 shows an example of a procedure performed when a user 2001 (including a shop or the like) performs the issuance of a public key certificate in a case in which, under management by the registration authority 1701, there is a user who uses contents, a shop that sells contents, or the like. The example is described in the order of the procedure.

In a device of the user 2001, the public key KpUD and private key KSUD of the user device, the public key KpRA of the registration authority 1701, and the public key KpIA of the public-key-certificate issuer authority 1602 are embedded as initial embedded keys, for example, in a memory in an SAM (secure Application module).

First, the user 2001 and the registration authority 1701 execute cross certification processing, and a session key is generated in the cross certification processing. This is performed using KpUD stored beforehand in the user 2001.

Next, the user 2001 uses its private key $K_{sUD}$ to sign the identifier SAMID of the user 2001, generates the data $E_{Ks}(\{SPID\}_{Sig \cdot KsIA})$ by performing encryption using the session key Ks generated in the cross certification, and transmits the generated data to the root registration authority 1701. The registration authority 1701 uses the session key Ks to decrypt the received data, recognizes the identifier SAMID, and executes signing processing on the recognition result. The registration authority 1701 also uses the session key to perform encryption, and executes recognition responding to the user 2001.

When receiving the recognition response from the registration authority 1701, the user 2001 generates its public key and private key, uses its private key KsUD to sign the public key KpUD', and generates the data $E_{Ks}(\{KPUD\}_{Sig \cdot KsIA})$ by performing encryption using the session key. The user 2001 transmits the generated data to the registration authority 1701.

When receiving the data, the registration authority 1701 executes cross certification with the root registration authority 1601, and generates a session key. Next, the registration authority 1701 uses its private key KsRA to sign the identifier SAMID and public key KpUD of the user 2001, uses the session key Ks2 to encrypt the signed keys, and transmits the encrypted keys to the root registration authority 1601.

The root registration authority 1601 performs decryption and verification processes by using the data-related session key transmitted from the registration authority 1701, and executes the requesting of the public-key-certificate issuer authority 1602 to issue a certificate of the user 2001. In addition, the root registration authority 1601 and the public-key-certificate issuer authority 1602 execute cross certification processing.

When certification is established in the cross certification processing, the root registration authority 1601 uses the private key of the root registration authority 1601 to execute the signing of the identifier SAMID and public key KpUD of the user 2001, and generates $E_{Ks}(\{SAMID, KpUD\}_{Sig \cdot KsRootSp})$ by performing encryption of the keys using the session key generated in the cross certification. The root registration authority 1601 transmits the generated data to the public-key-certificate issuer authority 1602.

After decrypting the received data $E_{Ks}(\{SAMID, KPUD\}_{Sig \cdot KsRootSp})$, and verifying the signature, the public-key-certificate issuer authority 1602 stores the public key KpUD of the user 2001 as management data in the database. In other words, the public-key-certificate issuer authority 1602 stores it as data in the database described with reference to FIG. 5.

The public-key-certificate issuer authority 1602 further generates a public key certificate of the user 2001. This is a public key certificate in accordance with the formats in FIGS. 6 and 7. The public-key-certificate issuer authority 1602 stores the generated public key certificate in the database for management (see FIG. 5). The public-key-certificate issuer authority 1602 also uses the private key KsIA of the public-key-certificate issuer authority 1602 to sign the public key certificate, namely, IA<<UD>> of the user 2001, which is issued by the public-key-certificate issuer authority 1602, and generates the data $E_{Ks3}(\{IA<<UD>>\}_{Sig \cdot KsIA})$ by performing encryption using the session key Ks3 generated in the cross certification processing. The public-key-certificate issuer authority 1602 transmits the generated data to the root registration authority 1601. The root registration authority 1601 verifies the signature, and uses its private key to sign the received data. The root registration authority 1601 encrypts the signed data by using the session key (the session key generated in the cross certification processing executed between the registration authority 1701 and the root registration authority 1601), and transmits the encrypted data to the registration authority 1701. The registration authority 1701 further uses its private key to sign the received data, encrypts the signed data by using the session key (the session key generated in the cross certification processing executed between the user 2001 and the registration authority 1701), and transmits the encrypted data to the user 2001. After decrypting the received data using the session key, and verifying the signature, the user 2001 stores the certificate.

In the above-described procedure, by omitting (5) the key generating process, the key embedded in the device of the user 2001 may be directly used as a public key. In addition, by performing cross certification in which an initially embedded key is used as a symmetric key, a signature on (2) the data may be an MAC generated using the symmetric key.

Figure 20:
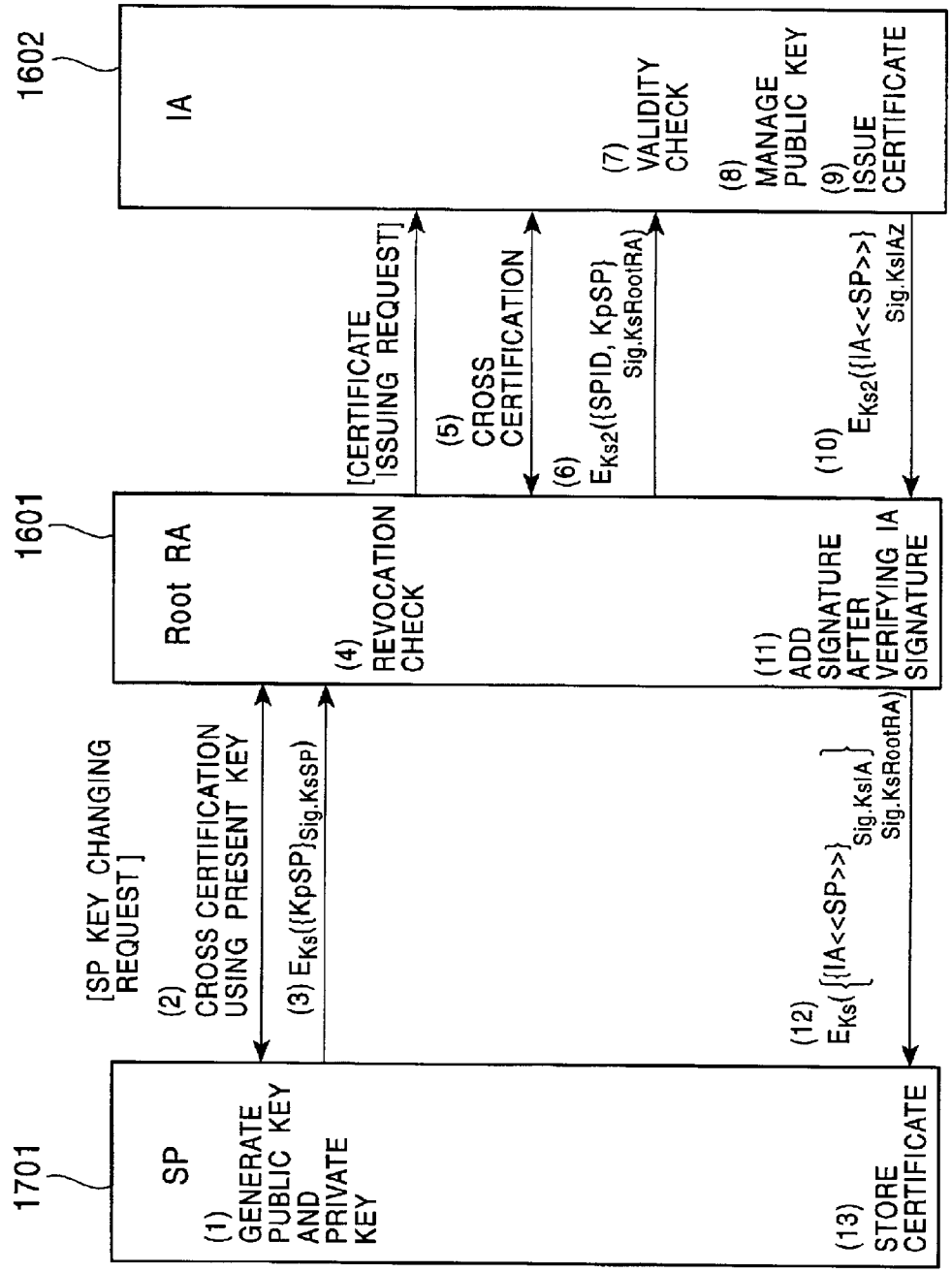
FIG. 20 is an illustration of key updating processing among a public-key-certificate issuer authority, a root registration authority, and a service provider in a public-key-encryption data-communication system of the present invention.

FIG. 20 is an illustration of a procedure or updating processing in which a service provider as the registration authority 1701 under management by the root registration authority 1601 generates a new public key and private key and performs issuance of a certificate of the newly generated public key.

The registration authority 1701 generates a new public key and private key. Next, the registration authority 1701 and the root registration authority 1601 execute cross certification processing. This can be executed as cross certification processing using the present keys (the public key and the private key at the present time (before updating)), i.e., processing using asymmetric key encryption described with reference to FIG. 14.

Next, the registration authority 1701 uses its private key to sign the public key KpSP' that is newly generated by the registration authority 1701, generates the data $E_{Ks}(\{KpSP'\}_{Sig \cdot KsSP})$ by performing encryption using the session key generated in the cross certification processing, and transmits the generated data to the root registration authority 1601. When receiving the data, the root registration authority 1601 executes revocation checking. The revocation checking is executed as the writing of public key data to be revoked in the revocation list described with reference to FIGS. 9 and 10.

The root registration authority 1601 further executes the requesting of the public-key-certificate issuer authority 1602 to issue a certificate of the registration authority 1701. In addition, the root registration authority 1601 and the public-key-certificate issuer authority 1602 execute cross certification processing.

When certification is established in the cross certification processing, the root registration authority 1601 uses the private key of the root registration authority 1601 to sign the identifier SPID of the registration authority 1701 and the public key KpSp of the registration authority 1701, generates $E_{Ks2}(\{SPID, KpSp'\}_{Sig \cdot KsRootSP})$ by performing encryption using the session key generated in the cross certification processing, and transmits the generated data to the public-key-certificate issuer authority 1602.

After decrypting the received data $E_{Ks2}(\{SPID, KpSp'\}_{Sig \cdot KsRootSP})$, and verifying the signature, the public-key-certificate issuer authority 1602 performs validity checking on the public key KpSP of the registration authority 1701. The validity checking is executed as processing in which, when the public key and public key certificate of the same user are stored in the database described with reference to FIG. 5, they are invalidated and a newly updated public key is validated. The public-key-certificate issuer authority 1602 issues and registers the newly updated public key certificate in the database.

The public-key-certificate issuer authority 1602 uses the private key KSIA of the public-key-certificate issuer authority 1602 to sign the generated public key certificate, namely, IA<<SP>>, generates data $E_{Ks2}(\{IA<<SP>>\}_{Sig \cdot KsIA})$ by performing encryption using the session key Ks generated in the cross certification processing, and transmits the generated data to the root registration authority 1601. The root registration authority 1601 verifies the signature and uses its private key to sign the received data, and encrypts the signed data by using the session key (the session key generated in the cross certification processing executed between the registration authority 1701 and the root registration authority 1601). The root registration authority 1601 transmits the generated data to the registration authority 1701. After decrypting the received data using the session key, and verifying the signature, the registration authority 1701 stores the certificate.

Figure 21:
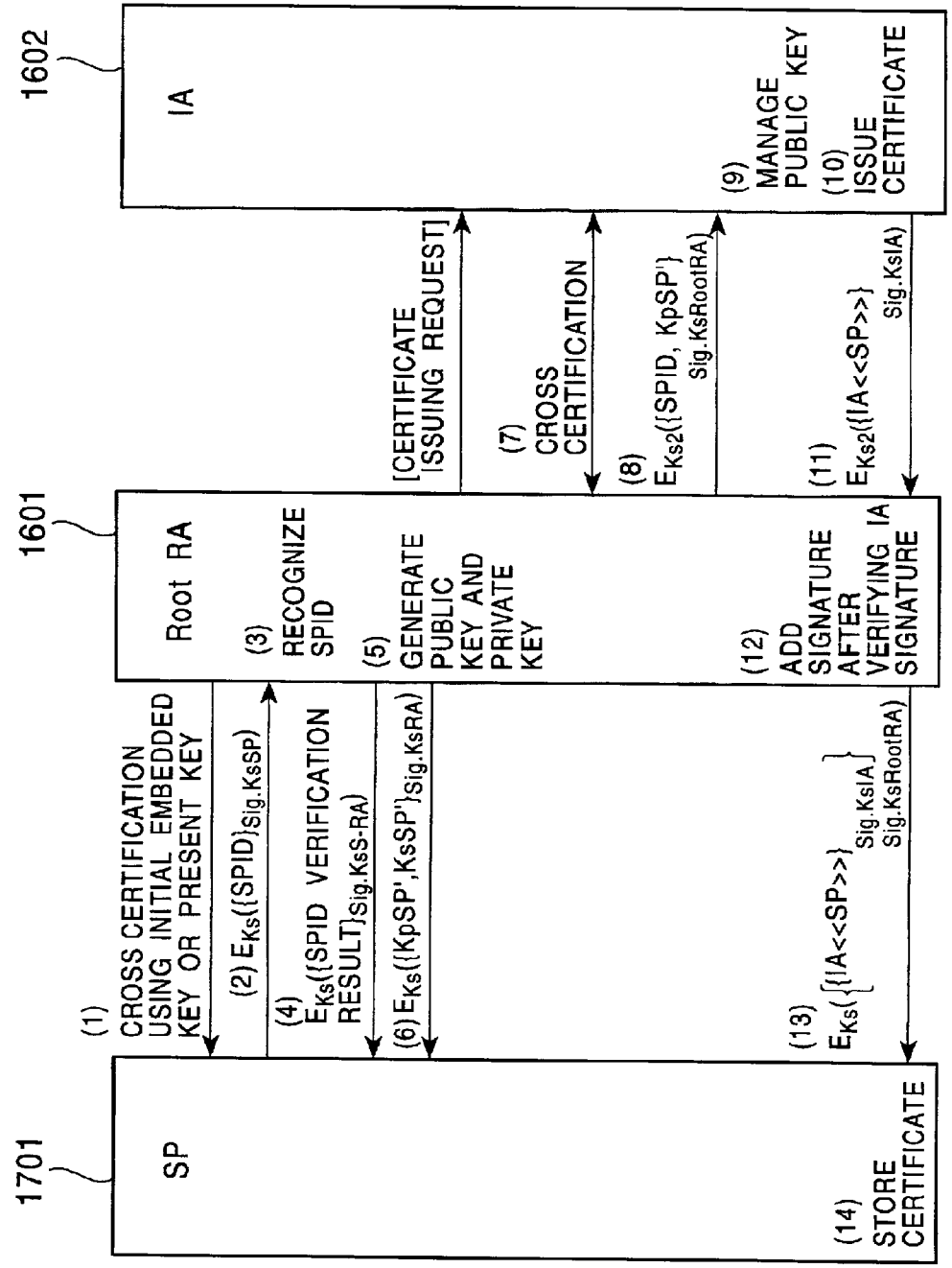
FIG. 21 is an illustration of key updating processing among a public-key-certificate issuer authority, a root registration authority, and a service provider in a public-key-encryption data-communication system of the present invention.

Similarly to FIG. 20, FIG. 21 is an illustration of a procedure for issuing a new public key and private key certificate of a service provider as the registration authority 1701 under management by the root registration authority 1601. However, in FIG. 21, the new public key and private key of the service provider are generated by the root registration authority 1601.

FIG. 21 differs from FIG. 20 in steps (2) to (6). These steps are described. The registration authority 1701 and the root registration authority 1601 execute cross certification processing. This is performed using cross certification keys (corresponding to the key Kab described with reference to FIG. 13) that are stored beforehand in, for example, memories of the registration authority 1701 and the root registration authority 1601, or using the present public key and private key (see FIG. 14).

Next, the registration authority 1701 uses its private key $K_{sSp}$ to sign the identifier SPID of the registration authority 1701, generates data $E_{Ks}(\{SPID\}_{Sig \cdot KsSP})$ by performing encryption suing the session key Ks generated in the cross certification, and transmits the generated data to the root registration authority 1601. After using the session key Ks to decrypt the received data, and verifying the signature, the root registration authority 1601 recognizes the identifier SPID. Having recognized it, the root registration authority 1601 generates a new public key and private key of the root registration authority 1601. After that, the root registration authority 1601 uses its private key to execute signing processing on the generated public key and private key of the registration authority 1701, encrypts them using the session key, and transmits the encrypted keys to the registration authority 1701. The subsequent steps are similar to those in FIG. 20.

Figure 22:
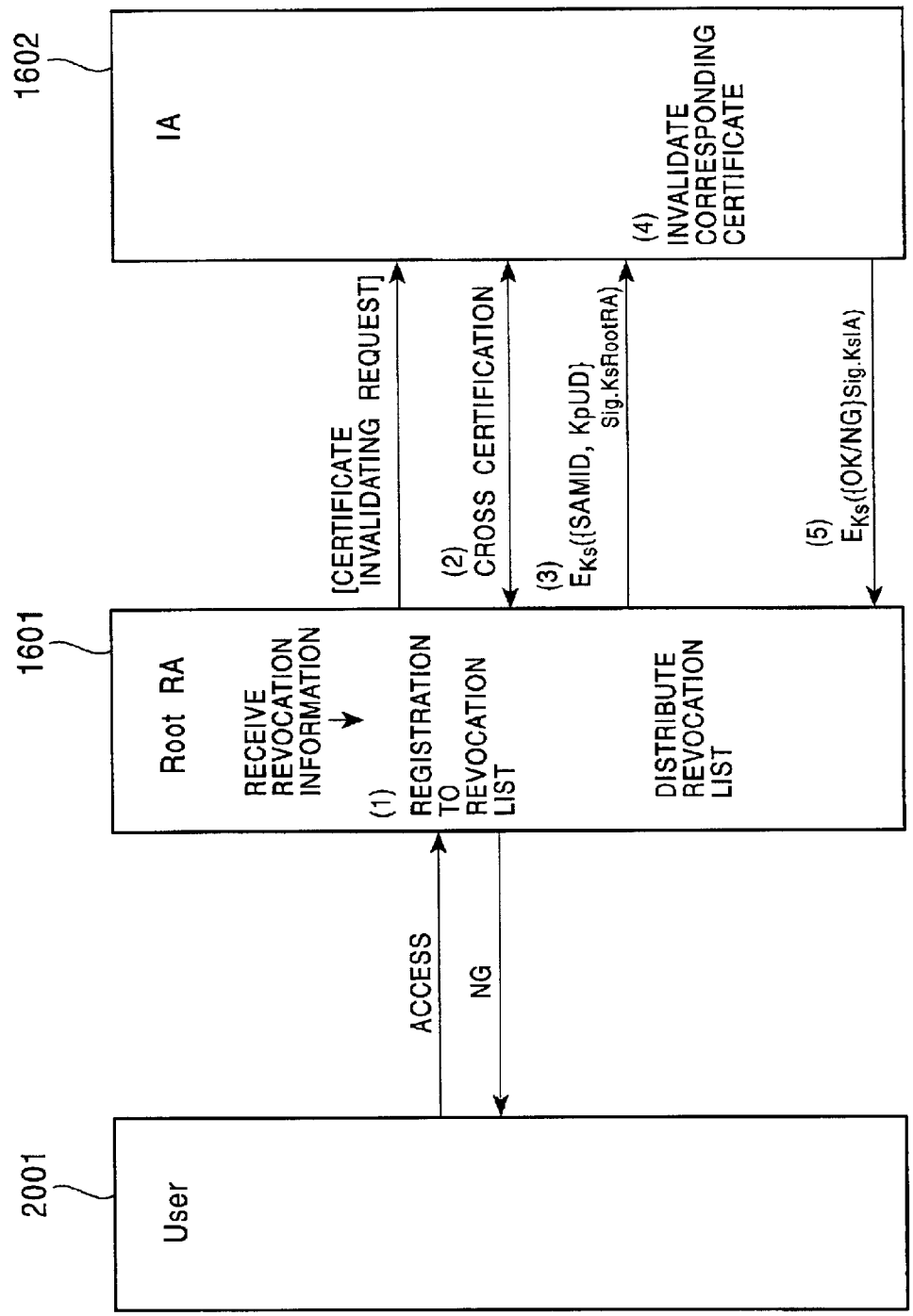
FIG. 22 is an illustration of key revocation processing among a public-key-certificate issuer authority, a root registration authority, and a user in a public-key-encryption data-communication system of the present invention.

Next, with reference to FIG. 22, revocation processing on a public key certificate is described. Although FIG. 22 shows the revocation processing as processes among the user 2001, the root registration authority 1601, and the public-key-certificate issuer authority 1602, if there is the registration authority 1701 between the user 2001 and the root registration authority 1601, the registration authority 1701 affects communication between the user 2001 and the root registration authority 1601.

The processing in FIG. 22 is described. The root registration authority 1601 performs processing for revocation when the public key of the user 2001 is, for example, unlawfully distributed, or in accordance with a request from the user 2001. This is executed as the process of adding the public-key information of the user 2001 to the revocation list described with reference to FIGS. 9 and 10. The root registration authority 1601 performs registration to the revocation list, and requests the public-key-certificate issuer authority 1602 to perform invalidation of the public key certificate.

First, the root registration authority 1601 and the public-key-certificate issuer authority 1602 execute cross certification processing. When certification is established, the root registration authority 1601 uses the private key of the root registration authority 1601 to sign the identifier SAMISD of the user 2001, which corresponds to a revoked public key, and the public key KpUD, generates $E_{Ks}(\{SAMID, KpUD\}_{Sig \cdot KsRootSP})$ by performing encryption using a session key generated in the cross certification, and transmits the generated data to the public-key-certificate issuer authority 1602.

After decrypting the received data $E_{Ks}(\{SAMID, KpUD\}_{Sig \cdot KsRootSP})$, and verifying the signature, the public-key-certificate issuer authority 1602 performs invalidation processing on the public key certificate corresponding to the public key KpUD of the user 2001. In other words, a flag in the database described with reference to FIG. 5 is set to indicate invalidation. The public-key-certificate issuer authority 1602 transmits, to the root registration authority 1601, data $E_{Ks}(\{OK/NG\}_{Sig \cdot KsIA})$ obtained such that a response that indicates whether the invalidation processing has been executed (OK or NG) is signed and is encrypted using the session key.

When the revocation processing on the public key certificate, which is consecutively performed, ends, the public key of the user 2001 is not allowed to be used under a service managed by the root registration authority 1601. In other words, transmission/reception and verification of data encrypted using the public key cannot be performed with the root registration authority 1601, and also with another service provider managed by the root registration authority 1601, dealing using the revoked public key is impossible. The root registration authority performs the differential distribution of the revocation list, as required.

Figure 23:
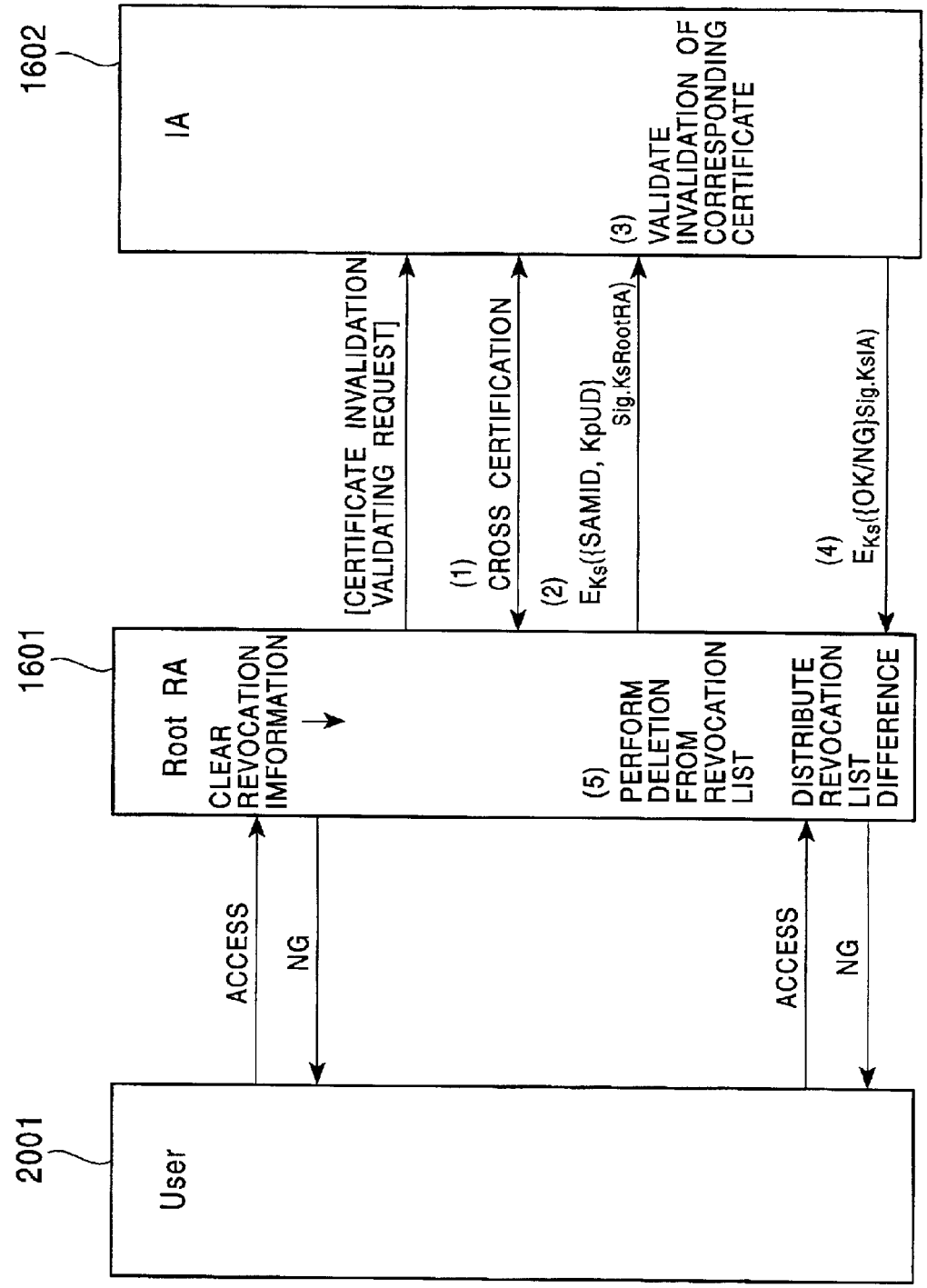
FIG. 23 is an illustration of key-revocation validating processing among a public-key-certificate issuer authority, a root registration authority, and a user in a public-key-encryption data-communication system of the present invention.

FIG. 23 illustrates the process of validating a revoked public key and a revoked public key certificate. When a public key is revoked, the user 2001 is denied (NG) access to the root registration authority 1601. When the root registration authority 1601 validates the revocation of the revoked public key, the root registration authority 1601 issues a certificate invalidating request to the public-key-certificate issuer authority 1602, and cross certification processing is executed between the root registration authority 1601 and the public-key-certificate issuer authority 1602.

When cross certification is established, the root registration authority 1601 uses the private key of the root registration authority 1601 to sign the identifier SAMISD of the user 2001, which corresponds to the public key to be validated, and the public key KpUD, generates $E_{Ks}(\{SAMID, KpUD\}_{Sig \cdot KsRootSP})$ by performing encryption using a session key generated in the cross certification, and transmits the generated data to the public-key-certificate issuer authority 1602.

After decrypting the received data $E_{Ks}(\{SAMID, KpUD\}_{Sig \cdot KsRootSP})$, and verifying the signature, the public-key-certificate issuer authority 1602 performs the processing of validating the revoked public key certificate corresponding to the public key KpUD of the user 2001. In other words, the flag in the database described with reference to FIG. 5 is set to indicate validation. The public-key-certificate issuer authority 1602 also transmits, to the root registration authority 1601, data $E_{Ks}(\{OK/NG\}_{Sig \cdot KsIA})$ obtained such that a response that indicates whether the validation processing has been executed (OK or NG) is signed and is encrypted using the session key. The root registration authority performs the differential distribution of the revocation list, as required.

When the validation processing on the public key certificate, which is consecutively performed, ends, the public key of the user 2001 is allowed to be used under the service managed by the root registration authority 1601.

Figure 24:
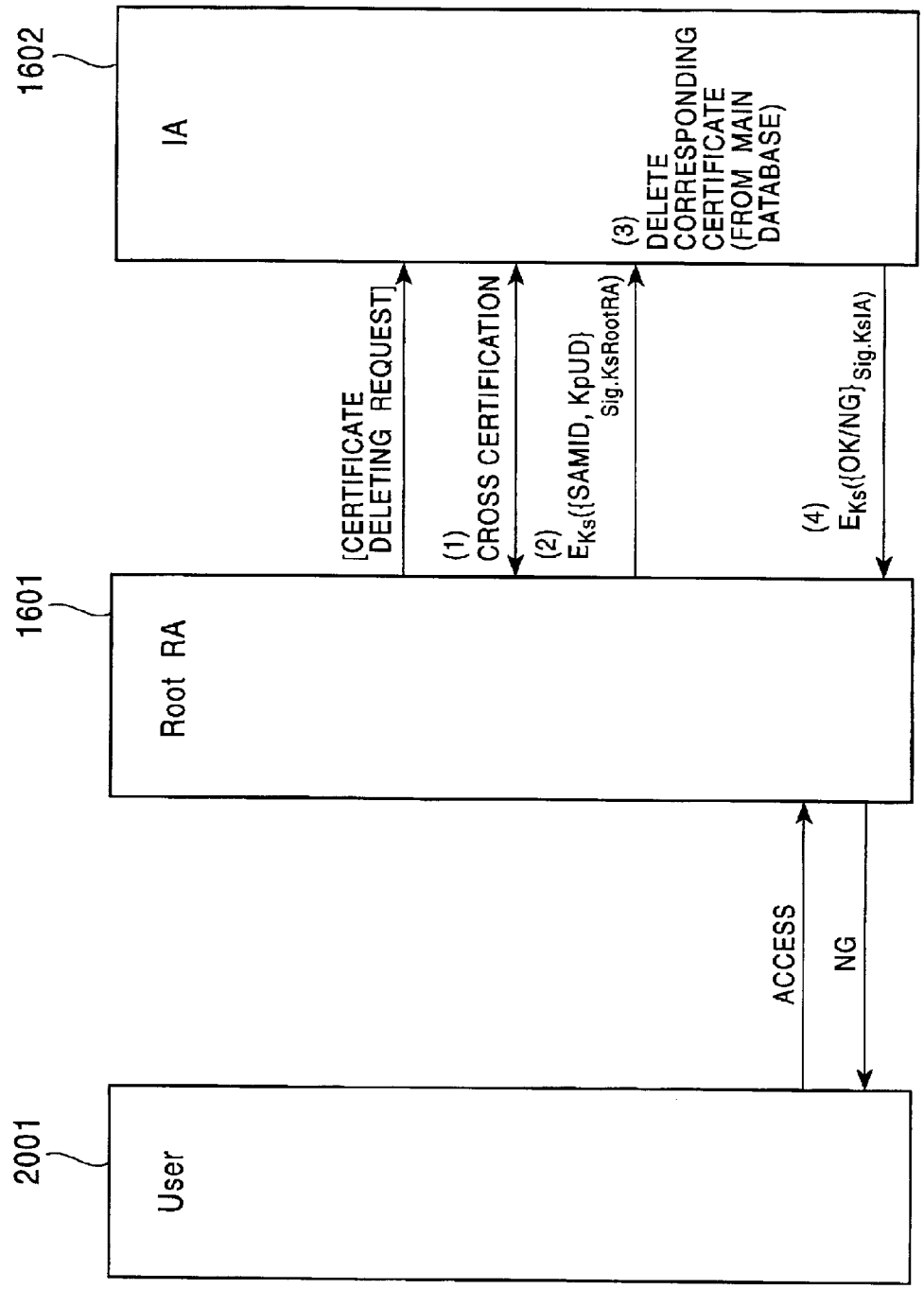
FIG. 24 is an illustration of public-key-certificate deleting processing among a public-key-certificate issuer authority, a root registration authority, and a user in a public-key-encryption data-communication system of the present invention.

FIG. 24 is an illustration of the processing of deleting a public key certificate. In this case, the root registration authority 1601 issues a certificate deleting request to the public-key-certificate issuer authority 1602, and cross certification processing is executed between the root registration authority 1601 and the public-key-certificate issuer authority 1602.

When cross certification is established, the root registration authority 1601 uses the private key of the root registration authority 1601 to sign the identifier SAMISD of the user 2001, which corresponds to the public key to be deleted, and the public key KpUD, generates $E_{Ks}(\{SAMID, KpUD\}_{Sig \cdot KsRootSP})$ by performing encryption using a session key generated in the cross certification, and transmits the generated data to the public-key-certificate issuer authority 1602.

After decrypting the received data $E_{Ks}(\{SAMID, KpUD\}_{Sig \cdot KsRootSp})$, and verifying the signature, the public-key-certificate issuer authority 1602 performs the processing of deleting the public key certificate corresponding to the public key KpUD of the user 2001. In other words, from the database described with reference to FIG. 5, corresponding public-key information is deleted. The public-key-certificate issuer authority 1602 also transmits, to the root registration authority 1601, data $E_{Ks}(\{OK/NG\}_{Sig \cdot KsIA})$ obtained such that a response that indicates whether the deletion processing has been executed (OK or NG) is signed and is encrypted using the session key.

When the deletion processing on the public key certificate, which is consecutively performed, ends, the public key of the user 2001 is not allowed to be used under the service managed by the root registration authority 1601.

Next, an example of construction is described in which the registration authority is set as a system holder in a hierarchical structure composed of the root registration authority and the registration authority.

The system holder is formed by, for example, an authority that organizes and manages an Internet shop market on the Internet, an authority that provides communication infrastructure for cellular phones, an authority that manages the use of cables for cable television, an electronic-money-card issuing body, or the like. In other words, the system holder is defined as an authority that provides and manages an infrastructure for distributing contents or services which enables provision of various contents and services and that manages devices.

Figure 25:
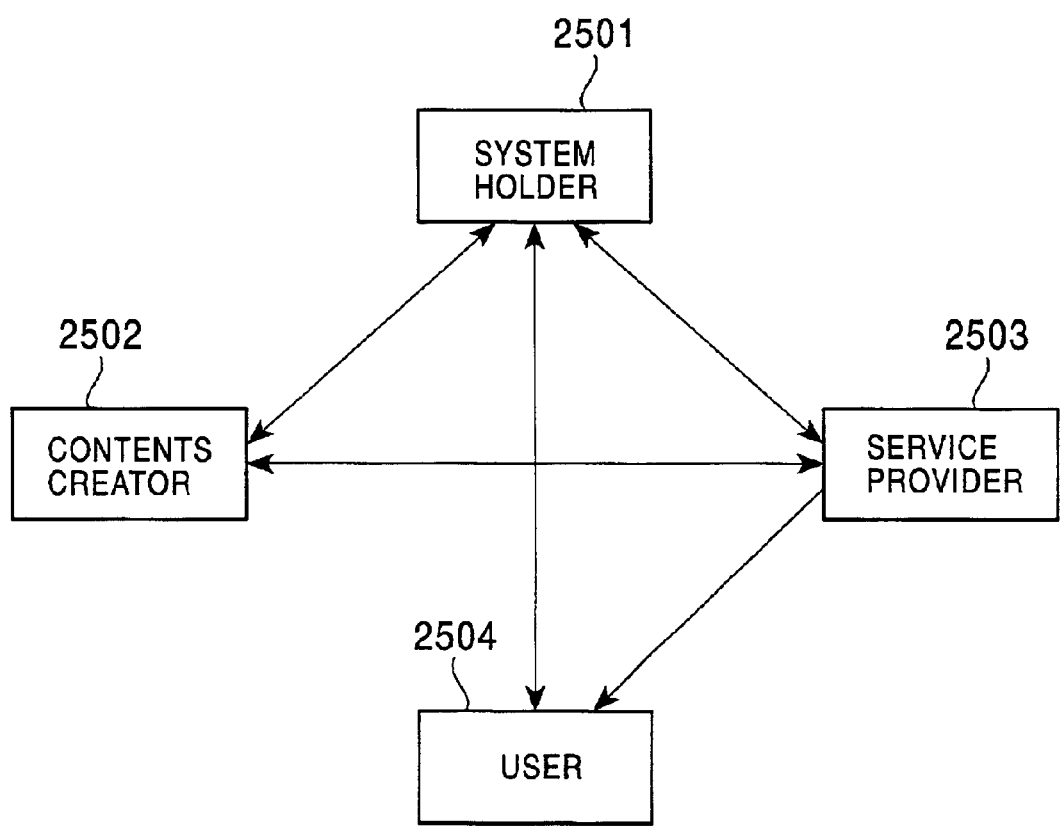
FIG. 25 is an illustration of a system holder and other authorities in a public-key-encryption data-communication system of the present invention.

In FIG. 25 is shown an illustration of the relationship among a system holder 2501, a contents creator 2502, a service provider 2503, and a user 2504, and in FIG. 26 are shown specific examples of the system holder, the contents creator, the service provider, and the user device.

In FIG. 25, the system holder 2501 provides an infrastructure for distributing contents and services that can be used in the contents creator 2502, the service provider 2503, and the user (device) 2504. The contents creator 2502 and the service provider 2503 provide contents or services by using the infrastructure provided by the system holder 2501. The user (device)2504 receives a service provided by the service provider 2503 by using the infrastructure provided by the system holder 2501.

In FIG. 26 are shown specific contents creator, service provider, and user device examples. As shown in FIG. 26, when the system holder is, for example, an internet-shop-market organizer authority, the contents creator provides goods to be provided to the Internet shop market. The service provider is a shop that sells the provided goods in the Internet shop, and the user device is a PC or the like that uses the Internet shop.

When the system holder is an authority that provides a cellular-phone communication infrastructure, such as a communication company or the like, the contents creator uses the cellular-phone communication infrastructure to make and produce providable contents and goods. The service provider uses the cellular-phone communication infrastructure to sell and provide the contents and goods provided by the contents creator to users. In this case, the user device is a cellular phone.

When the system holder is an authority that provides a cable television communication infrastructure, such as a cable-television-cable-communication management company, the contents creator uses the cable-television communication infrastructure to make and produce providable contents and goods. Also programs that are provided to the cable television are included in the contents. The service provider uses the cable-television communication infrastructure to sell and provide the contents and goods provided by the contents creator to the users, and is, for example, a cable television company that directly collects audience charges from viewers.

When the system holder is an authority that provides electronic money settlement infrastructure, such as an electronic money issuing authority, the contents creator is a content and goods providing authority that provides goods that can be used (purchased) by electronic money, the service provider is a selling shop realized as a shop in which the contents and good provided by the contents creator can be used using electronic money. The user device is an IC card to which electronic money is input, or the like.

In addition, there are various types of system holders, and depending on the type of system holder, a contents creator, a service provider, and a user device are formed. In other words, the system holder is defined as an authority that provides and manages a contents or service providing infrastructure enabling provision of contents and services usable by the user device.

Here, a distribution construction is described in which contents or services can be easily used for the users by controlling the system holder to implement the functions of the above-described registration authority.

Figure 27:
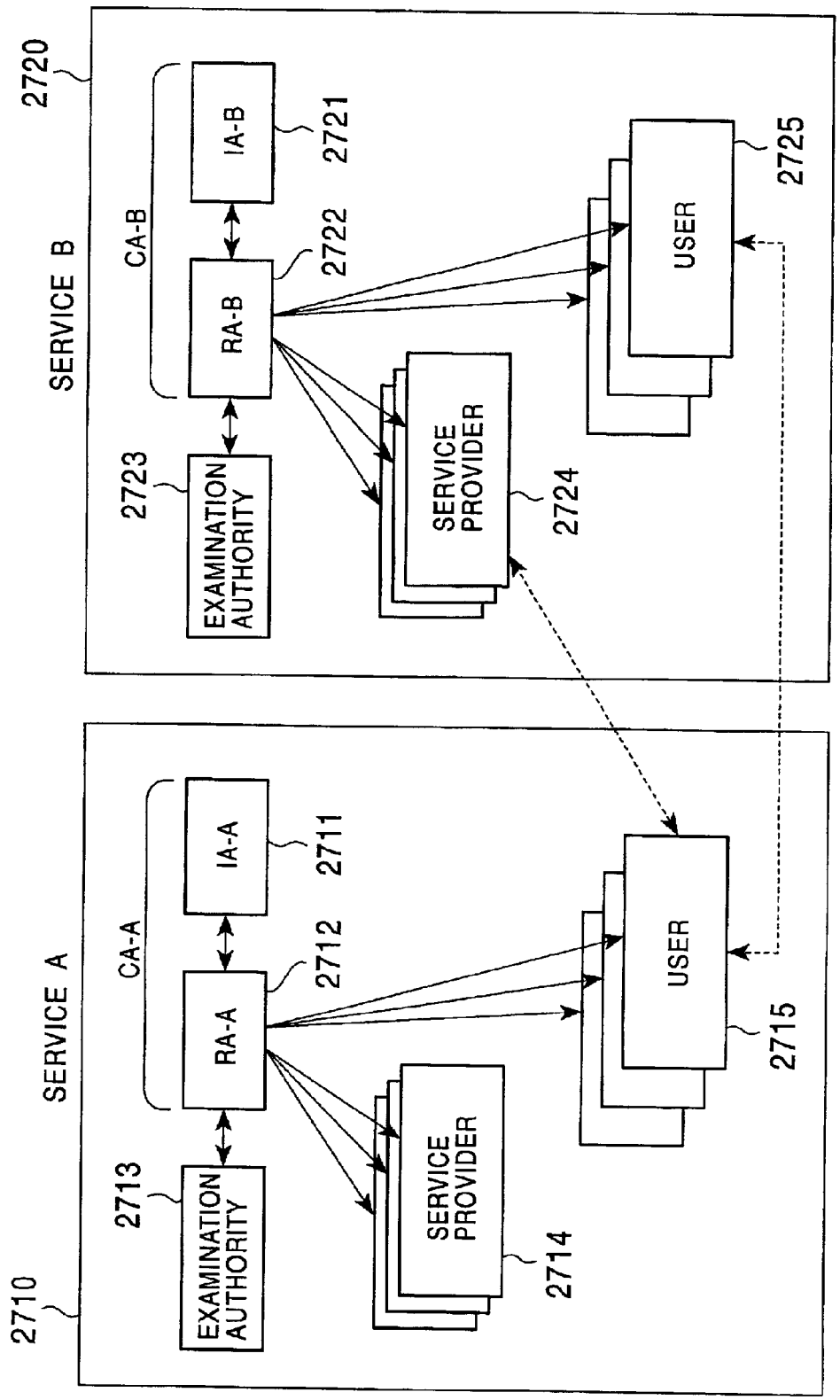
FIG. 27 is an illustration of an example in which a public key certificate is used when a system holder does not have a hierarchical structure with respect to a root registration authority.

First, FIG. 27 is used to describe a public-key-cryptosystem distribution construction for contents or services in a form in which the system holder is not provided with the functions of the registration authority.

As shown in FIG. 27, various types of services that can be used by the users exit. Each of the types uses its unique public key encryption, i.e., the issuance of a unique public key certificate that is effective only in a particular service by performing unique examination and unique registration, whereby the particular service is provided. FIG. 27 shows this conventional service providing construction. In FIG. 27 are shown a group 2710 that provides service A and a group 2720 that provides service B.

The group 2710 that provides service A includes a public-key-certificate issuer authority (IA-A) 2711 that is usable for providing service A, a service provider 2714 that requests the use of a public key certificate, and a registration authority (RA-A) 2712 that executes the registration and management of a user (device) 2715. Based on an examination by, for example, an official examination authority 2713, the registration authority 2712 performs, the registration of the service provider 2714 and the user (device) 2715, requests the public-key-certificate issuer authority (IA-A) 2711 to issue a certificate, and performs the management of the service provider 2714 and the user (device) 2715. The public-key-certificate issuer authority (IA-A) 2711 and the registration authority (RA-A) 2712 constitute a certificate authority (CA-A).

The group 2720 that provides service B includes a public-key-certificate issuer authority (IA-B) 2721 that is usable for providing service B, a service provider 2724 that requests the use of a public key certificate, and a registration authority (RA-B) 2722 that executes the registration and management of a user (device) 2725. Based on an examination by, for example, an official examination authority 2723, the registration authority 2722 performs, the registration of the service provider 2724 and the user (device) 2725, requests the public-key-certificate issuer authority (IA-B) 2721 to issue a certificate, and performs the management of the service provider 2724 and the user (device) 2725. The public-key-certificate issuer authority (IA-B) 2721 and the registration authority (RA-B) 2722 constitute a certificate authority (CA-B).

When, in this construction, the user 2715, to which a public key certificate usable in service A is issued by performing registration via the registration authority (RA-A) 2712 in order to be provided with service A, receives a service in service B, the issued public key certificate cannot be used. In order that the user 2715 may receive a service in service B, it is essential to perform a new registration procedure using the registration authority (RA-B) 2722 so that a new public key certificate is issued.

To solve this point, it is possible that certification be performed by both the certificate authorities (CAs) that are each composed of the public-key-certificate issuer authority and the registration authority shown in FIG. 27, or it is possible that the certificate authorities (CAs) be formed to have a hierarchy. However, this causes a defect in a processing load in the certificate authority increases and in that the certificate authority structure becomes complex. Otherwise, when a construction is employed in which a plurality of public key certificates corresponding to a plurality of services are stored in the device in order that the user may receive the services, the storage area of the user device is much used to store the public key certificates. This construction causes a problem in a device having a limited storage area, such as an IC card.

When both the user device 2715 and the user device 2725 in FIG. 27 perform cross certification in offline, both have different certificate authorities that control them, the cross certification cannot be executed. In order that cross certification may be effectively executed, both a public key of a certificate authority that controls a device itself and a public key of a certificate authority that controls an associated device must be stored in the devices, so that the number of public keys to be stored increases more when certification with various associated devices is required.

In the construction in FIG. 27 that performs independent management for each service, various problems occur. It is a construction shown in FIG. 28 in which each system holder is positioned at a hierarchy below each root registration authority that solves the problems.

Figure 28:
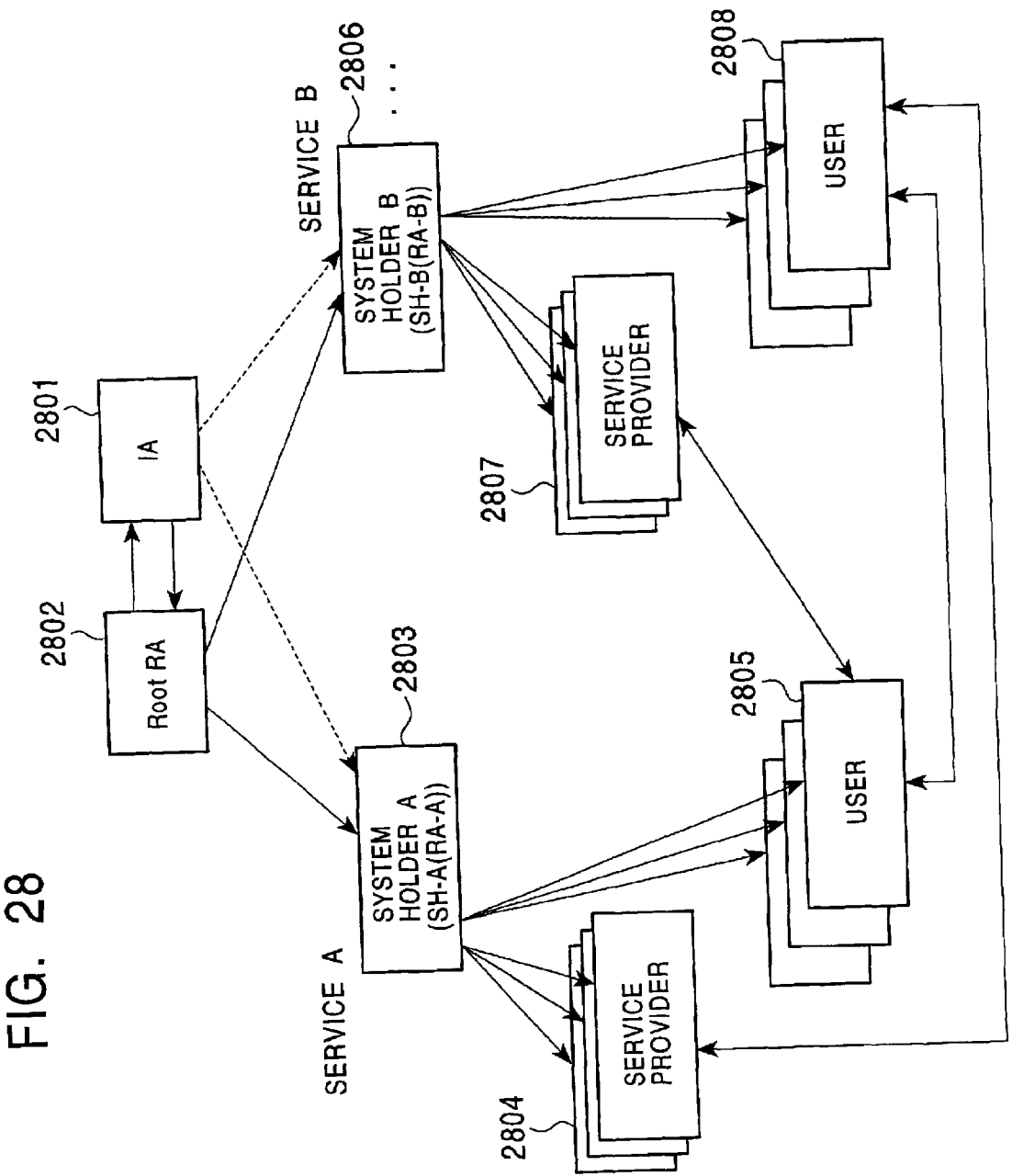
FIG. 28 is an illustration of an example in which a public key certificate is used when a system holder has a hierarchical structure with respect to a root registration authority.

The construction in FIG. 28 is described. The construction in FIG. 28 corresponds to that in FIG. 27, and includes a group of service providers in which the left one provides service A and the right one provides service B. A service provider 2804 is a body providing service A, and a service provider 2807 is a body providing service B.

The service provider 2804, a user (device) 2805, the service provider 2807, and a user (device) 2808 are subjects to be certificated, namely, bodies that execute data transmission and reception using public key encryption. Although FIG. 28 shows the construction corresponding to two services A and B, many services can exist.

The system holder A (2803) acts and functions as the above-described registration authority. The service provider 2804 and the user (device) 2805 as subjects to be certificated, which are under the control of the system holder A, request the system holder A (2803) to issue public key certificates. The system holder B (2806) receives public-key-certificate issuing requests from the service provider 2807 and the user (device) 2808.

Each of the system holder A (2803) and the system holder B (2806) certificates subjects (entities participating in service, apparatuses) in each service. Each of the system holder A (2803) and the system holder B (2806) receives a public-key-certificate issuing request about a public (entity participating in service, apparatus) key used by a subject in each service, and transfers it to a public-key-certificate issuer authority 2801 via a root registration authority 2802. The root registration authority 2802 accepts public-key-certificate issuing requests from the system holder A (2803) and the system holder B (2806), which are certificated. In other words, the root registration authority 2802 receives a public-key-certificate issuing request when the request is from the system holder A (2803) or the system holder B (2806), which is certificated by the root registration authority 2802.

In FIG. 28, the service provider 2804 and the service provider 2807 are service providers that execute provision of service for distributing contents such as music data, image data, and game programs, and are formed by the service providing bodies for providing various services, which have been described with reference to FIG. 26.

The system holder A (2803) and the system holder B (2806) are authorities that manage infrastructures for realizing the services provided by the service provider 2804 and the service provider 2807, and are formed by the cellular-phone-communication infrastructure provider, the electronic-money/card issuing authority, etc., which have been described with reference to FIG. 26.

This embodiment is characterized in that a system holder that provides or manages an infrastructure for realizing provision of contents and provision of services operates as an interagent in public-key-certificate certification and issuance of public key certificates of a data-communication implementing service provider and user device, and performs management of registration. Since the system holder is an authority that provides or manages an infrastructure for enabling provision of contents and provision of services, the system holder performs, in many cases, the management of users and service providers that use the infrastructure, and usually includes a management database. By using the management database to also perform the management of public-key-certificate receivers, efficient management of users or service providers can be executed.

When a new communication infrastructure is constructed, and a new system holder appears, by setting the new system holder to be under the control of an existing root registration authority and public-key-certificate issuer authority, a public-key-certificate issuing construction using the new infrastructure is easily realized, and provision of service using the new infrastructure is realized.

The user device can be controlled to use various services such that one public key certificate is only stored in the user device. In other words, since in the construction in FIG. 28, one root registration authority and one public-key-certificate issuer authority are set to correspond to the system holders and the service providers, the user device can use different services by retaining one public key certificate. In addition, between user devices which are under the control of different system holders, cross certification can be performed using a public key issued by one common public-key-certificate issuer authority.

Figure 29:
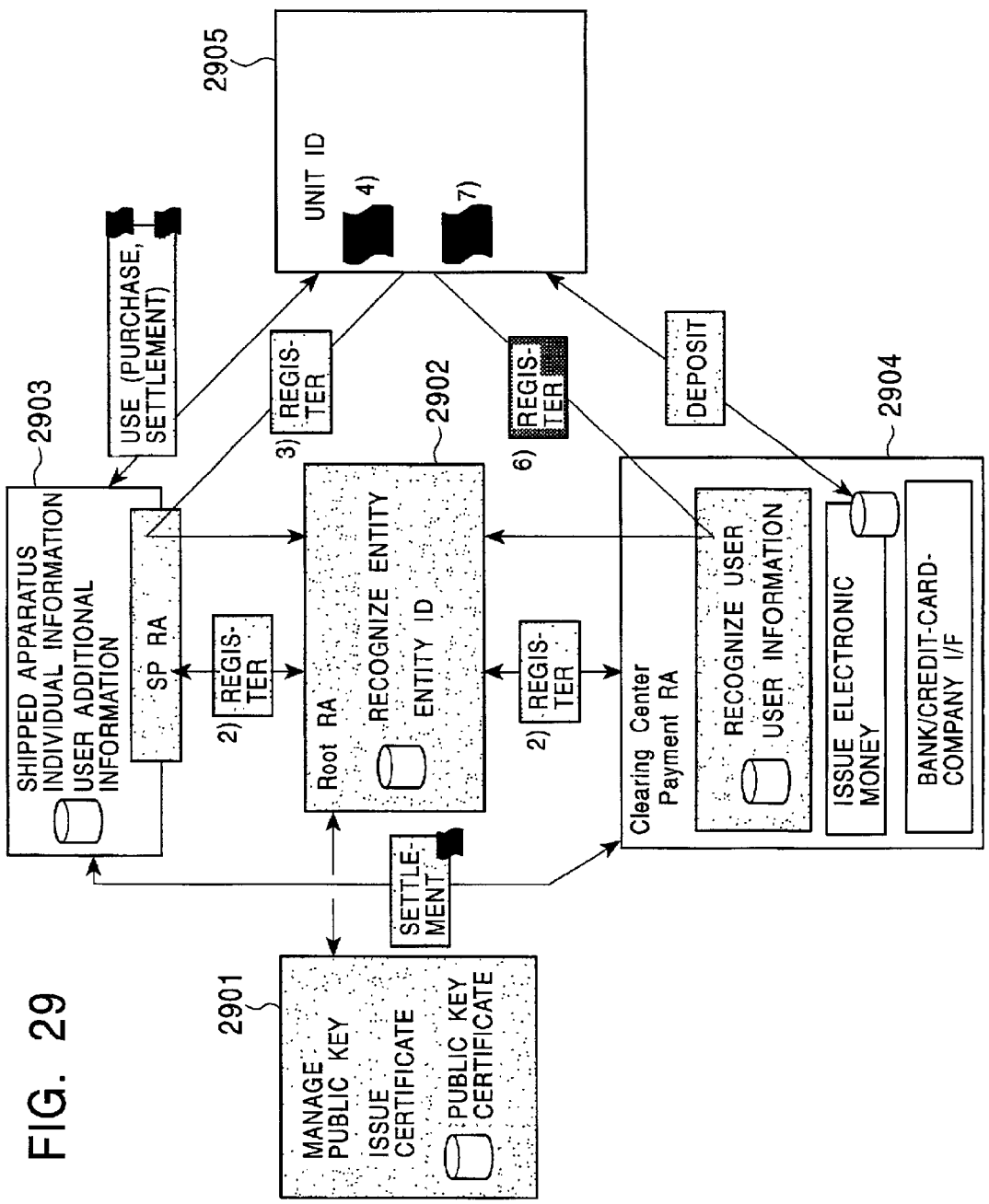
FIG. 29 is an illustration of an example in which a public key certificate is used among a public-key-certificate issuer authority, a root registration authority, a registration authority, and a user in a public-key-encryption data-communication system of the present invention.

Next, FIG. 29 is used to describe a specific construction for the use of a public key certificate in the public-key-certificate issuing system and data communication method of the present invention.

The construction in FIG. 29 includes a public-key-certificate issuer authority 2901 for performing public key management and public-key-certificate issuance, an entity, namely, a root registration authority 2902 for performing recognition processing for a subject to be certificated that requests issuance of a public key and a public key certificate, a service provider 2903 as a registration authority, a clearing center 2904, and a user terminal 2905.

The registration authority 2902 is certificated by the public-key-certificate issuer authority 2901, and possesses a public key and private key of the root registration authority 2902, and a public key certificate. A public key of the root registration authority 2902 and a public key of the public-key-certificate issuer authority 2901 are posted to the service provider 2903 as a registration authority which is under the control of the root registration authority 2902, the clearing center (payment RA) 2904, and the user terminal 2905, or are embedded in each apparatus.

The service provider 2903 and the clearing center 2904 register identifiers in the root registration authority 2902, and obtain public key certificates issued by the public-key-certificate issuer authority 2901 (process 2 shown).

To receive a service from the service provider 2903, the user terminal 2905 registers an apparatus by transmitting a unit identifier to the registration authority as the service provider 2903 via an SAM (Secure Application Module) of the user terminal 2905 (process 3 shown).

After verifying whether a user terminal identified for a service provider (e.g., a service provider or shop not shown) by a unit identifier can use a service, the registration authority as the service provider 2903 issues a public key certificate via the public-key-certificate issuer authority 2901. The user terminal 2905 stores the issued public key certificate in the SAM of the user terminal (denoted by 4 shown). These processes enable the user terminal 2905 to perform public-key data communication in the system shown in FIG. 29 and to receive the provided service.

To receive a service from the clearing center (payment RA) 2904, the user terminal 2905 registers an apparatus by transmitting a unit identifier to the registration authority as the service provider 2903 via the SAM (Secure Application Module) of the user terminal 2905 (process 6 shown).

When executing payment processing on contents charges by means of the clearing center 2904, using electronic money stored in the user terminal's SAM, the user terminal 2905 registers the identifier of the user terminal 2905 in the clearing center 2904.

The clearing center 2904 performs credit control, etc., for a settlement authority such as a bank, identifies a user (payer), and issues a public key certificate via the root registration authority 2902 and the public-key-certificate issuer authority 2901. The user terminal 2905 stores the issued public key certificate in the user terminal's SAM (process 7 shown).

When being provided with a service managed by the service provider 2903, the user terminal 2905 uses the public key certificate received via the service provider 2903. When using the service of the clearing center 2904, or performs payment processing, the user terminal 2905 uses the public key certificate obtained by the clearing center 2904.

When the clearing center 2904 needs to directly use the public key certificate transferred to the user terminal via the service provider 2903, the clearing center 2904, public-key-certificate generating processing via the clearing center 2904 is not performed, and by performing processing in both the clearing center 2904 and the root registration authority 2902, an already generated public key certificate is used as an effective public key certificate for settlement by the clearing center 2904.

As described above, the present invention has been fully described with reference to particular embodiments. However, it is obvious that a person skilled in the art can modify or substitute the embodiments within the spirit of the present invention. In other words, the present invention has been disclosed in the form of embodiments, and should not be interpreted in a limited sense. To understand the spirit of the present invention, the appended claims should be considered.

What is claimed is:

1. A public-key-encryption data-communication system comprising:
   a public-key-certificate issuer authority for issuing a public key certificate corresponding to a subject to be certificated, the subject performing data transfer using public key encryption;
   a root registration authority for executing mutual data transfer with said public-key-certificate issuer authority, said root registration authority performing certification of the subject when the subject is under the control of said root registration authority and requesting said public-key-certificate issuer authority to issue the public key certificate corresponding to the subject; and
   a registration authority for executing mutual data transfer with said root registration authority, said registration authority performing certification of the subject when the subject is under the control of said registration authority and requesting said root registration authority to issue the public key certificate corresponding to the subject,
   wherein at least one of said root registration authority and said registration authority possesses a revocation list concerning public key certificates corresponding to subjects which are under the control of said at least one, and said at least one executes the updating of said revocation list including the issuance data and time, the next data and time, and the version information.

2. A public-key-encryption data-communication system according to claim 1, wherein:
   said root registration authority treats a plurality of registration authorities as subjects to be certificated; and
   each of said plurality of registration authorities treats, as a subject to be certificated, one of at least one service provider, at least one user terminal, and at least one user which are under the control of the registration authority.

3. A public-key-encryption data-communication system according to claim 1, wherein said registration authority or at least one service provider which is under the control of said registration authority applies, to a plurality of different services, a public key certificate corresponding to a subject to be certificated which is under the control of said registration authority or of said at least one service provider which is under the control of said registration authority.

4. A public-key-encryption data-communication system according to claim 1, wherein:
   said root registration authority includes, as one of a plurality of registration authorities as subjects to be certificated which are under the control of said root registration authority, a clearing center for executing settlement processing; and
   in processing using a public key certificate which is issued via said clearing center, settlement is performed which relates to a service provided by a registration authority other than said clearing center which is under the control of said root registration authority or by at least one service provider which is under the control of said registration authority other than said clearing center.

5. A public-key-encryption data-communication system according to claim 1, wherein:
   said public-key-certificate issuer authority holds a list of the correspondence among public keys and corresponding public key certificates, and the identifiers of subjects to be certificated for which the public key certificates are issued; and
   either said root registration authority or said registration authority holds entity data which correspond to the subjects and which include certification data on the subjects.

6. A public-key-encryption data-communication system according to claim 1, wherein:
   the public key certificates each include an electronic signature field for an electronic signature of said public-key-certificate issuer authority; and
   a plurality of algorithms are used as a signature algorithm for the electronic signature generated in said electronic signature field, and the public key certificates each include a field identifying the used algorithm.

7. A public-key-encryption data-communication system according to claim 1, wherein:

in data transfer between said public-key-certificate issuer authority and said root registration authority, cross certification processing is performed, and when the cross certification is established, mutual data transfer is executed;

in data transfer between said root registration authority and said registration authority, cross certification processing is performed, and when the cross certification is established, mutual data transfer is executed; and in data transfer between said registration authority and the subject, cross certification processing is performed, and when the cross certification is established, mutual data transfer is executed.

8. A public-key-encryption data-communication system according to claim 1, wherein, between two among said public-key-certificate issuer authority, said root registration authority, said registration authority, and the subject, data is transferred in a form in which said data includes a generated electronic signature of a data transmitting side.

9. A public-key-encryption data-communication system according to claim 1, wherein at least one of said root registration authority and said registration authority requests the issuance of a plurality of public key certificates corresponding to a plurality of services which are under the control of the one authority.

10. A public-key-encryption data-communication system according to claim 1, wherein:

the public key certificate includes a common electronic signature of said public-key-certificate issuer authority which issues the public key certificate; and one of a root registration authority, a registration authority, a service provider, and a user device which perform processing for the verification of one public key certificate issued by said public-key-certificate issuer authority performs offline processing for the verification of different public key certificates issued by a single public-key-certificate issuer authority.

11. A public-key-encryption data-communication system according to claim 1, wherein:

said registration authority is formed as a system holder as an authority which provides or manages a distribution infrastructure for contents which are usable by a user terminal, contents for use in providing a service, or a service; and said system holder controls and treats a service provider and said user terminal as subjects to be certificated.

12. A public-key-encryption data-communication system according to claim 11, wherein:

under the control of said system holder, said system holder has contents creator which performs provision of contents by using a distribution infrastructure for contents or a service provided or managed by said system holder; and said system holder treats said contents creator as a subject to be certificated.

13. A public-key-encryption data-communication system according to claim 1, wherein said root registration authority controls a plurality of system holders which provide or manage an infrastructure for distributing different contents or services, receives a public-key-certificate issuing request via one of the system holders from one of at least one service provider and at least one user terminal which are under the control of the one system holder, and requests said public-key-certificate issuer authority to issue a public key certificate.

14. A public-key-encryption data-communication system according to claim 1, wherein a user device which is under the control of a plurality of different system holders controlled by a common public-key-certificate issuer authority has a public key of said common public-key-certificate issuer authority.

15. A public-key-encryption data-communication-system forming method comprising the steps of:

requesting, by a subject to be certificated, a registration authority to issue a public key certificate;

transferring, from said registration authority to a root registration authority certificating said registration authority, a public-key-certificate issuing request from the subject; and transferring, from the root registration authority to a public-key-certificate issuer authority certificating the root registration authority, the public-key-certificate issuing request from the subject, wherein at least one of said root registration authority and said registration authority possesses a revocation list concerning public key certificates corresponding to subjects which are under the control of said at least one, and said at least one executes the updating of said revocation list including the issuance data and time, the next data and time, and the version information.

16. A public-key-encryption data-communication-system forming method according to claim 15, wherein:

said root registration authority treats a plurality of registration authorities as subjects to be certificated; and each of said plurality of registration authorities treats, as a subject to be certificated, one of at least one service provider, at least one user terminal, and at least one user which are under the control of the registration authority.

17. A public-key-encryption data-communication-system forming method according to claim 15, wherein said registration authority or at least one service provider which is under the control of said registration authority applies, to a plurality of different services, a public key certificate corresponding to a subject to be certificated which is under the control of said registration authority or of said at least one service provider which is under the control of said registration authority.

18. A public-key-encryption data-communication-system forming method according to claim 15, wherein:

said root registration authority includes, as one of a plurality of registration authorities as subjects to be certificated which are under the control of said root registration authority, a clearing center for executing settlement processing; and in processing using a public key certificate which is issued via said clearing center, settlement is performed which relates to a service provided by a registration authority other than said clearing center which is under the control of said root registration authority or by at least one service provider which is under the control of said registration authority other than said clearing center.

19. A public-key-encryption data-communication-system forming method according to claim 15, wherein:

said public-key-certificate issuer authority holds a list of the correspondence among public keys and corresponding public key certificates, and the identifiers of subjects to be certificated for which the public key certificates are issued; and either said root registration authority or said registration authority holds entity data which correspond to the subjects and which include certification data on the subjects.

20. A public-key-encryption data-communication-system forming method according to claim 15, wherein:

in data transfer between said public-key-certificate issuer authority and said root registration authority, cross certification processing is performed, and when the cross certification is established, mutual data transfer is executed;

in data transfer between said root registration authority and said registration authority, cross certification processing is performed, and when the cross certification is established, mutual data transfer is executed; and in data transfer between said registration authority and the subject, cross certification processing is performed, and when the cross certification is established, mutual data transfer is executed.

21. A public-key-encryption data-communication-system forming method according to claim 15, wherein, between two among said public-key-certificate issuer authority, said root registration authority, said registration authority, and the subject, data is transferred in a form in which said data includes a generated electronic signature of a data transmitting side.

22. A public-key-encryption data-communication-system forming method according to claim 15, wherein at least one of said root registration authority and said registration authority requests the issuance of a plurality of public key certificates corresponding to a plurality of services which are under the control of the one authority.

23. A public-key-encryption data-communication-system forming method according to claim 15, wherein:

the public key certificate includes a common electronic signature of said public-key-certificate issuer authority which issues the public key certificate; and one of a root registration authority, a registration authority, a service provider, and a user device which perform processing for the verification of one public key certificate issued by said public-key-certificate issuer authority performs offline processing for the verification of different public key certificates issued by a single public-key-certificate issuer authority.

24. A public-key-encryption data-communication-system forming method according to claim 15, wherein:

said registration authority is formed as a system holder as an authority which provides or manages a distribution infrastructure for contents which are usable by a user terminal, contents for use in providing a service, or a service; and said system holder controls and treats a service provider and said user terminal as subjects to be certificated.

25. A public-key-encryption data-communication-system forming method according to claim 24, wherein said root registration authority controls a plurality of system holders which provide or manage an infrastructure for distributing different contents or services, receives a public-key-certificate issuing request via one of the system holders from one of at least one service provider and at least one user terminal which are under the control of the one system holder, and requests said public-key-certificate issuer authority to issue a public key certificate.

26. A public-key-encryption data-communication-system forming method according to claim 24, wherein:

under the control of said system holder, said system holder has contents creator which performs provision of contents by using a distribution infrastructure for contents or a service provided or managed by said system holder; and said system holder treats said contents creator as a subject to be certificated.

27. A public-key-encryption data-communication-system forming method according to claim 24, wherein a user device which is under the control of a plurality of different system holders controlled by a common public-key-certificate issuer authority has a public key of said common public-key-certificate issuer authority.

* * * * *